United States Patent
Tago et al.

(10) Patent No.: US 9,589,020 B2
(45) Date of Patent: Mar. 7, 2017

(54) MATCHING METHOD AND COMPUTER-READABLE RECORDING MEDIUM

(71) Applicant: FUJITSU LIMITED, Kawasaki-shi, Kanagawa (JP)

(72) Inventors: Shinichiro Tago, Shinagawa (JP); Takashi Katoh, Yokohama (JP); Hiroya Inakoshi, Tama (JE)

(73) Assignee: FUJITSU LIMITED, Kawasaki (JP)

( * ) Notice: Subject to any disclaimer, the term of this patent is extended or adjusted under 35 U.S.C. 154(b) by 220 days.

(21) Appl. No.: 14/307,740

(22) Filed: Jun. 18, 2014

(65) Prior Publication Data

US 2015/0026191 A1  Jan. 22, 2015

(30) Foreign Application Priority Data

Jul. 16, 2013  (JP) .................................. 2013-147955

(51) Int. Cl.
*G06F 7/00* (2006.01)
*G06F 17/30* (2006.01)

(52) U.S. Cl.
CPC .............................. *G06F 17/30477* (2013.01)

(58) Field of Classification Search
CPC ............... G06F 17/30; G06F 17/30321; G06F 17/30477; G06F 17/3051; G06F 17/30551; G06Q 10/063
See application file for complete search history.

(56) References Cited

U.S. PATENT DOCUMENTS

| | | | |
|---|---|---|---|
| 2006/0200778 A1* | 9/2006 | Gritzman | G06F 3/0481 715/781 |
| 2006/0271878 A1* | 11/2006 | Hashimoto | G06F 3/048 715/781 |
| 2009/0112853 A1 | 4/2009 | Nishizawa et al. | |
| 2010/0106710 A1 | 4/2010 | Nishizawa et al. | |
| 2011/0016160 A1* | 1/2011 | Zhang | G06F 17/30386 707/805 |
| 2012/0330868 A1 | 12/2012 | Tago et al. | |

FOREIGN PATENT DOCUMENTS

| | | |
|---|---|---|
| JP | 2004-46601 | 2/2004 |
| JP | 2009-134689 | 6/2009 |
| JP | 2010-108073 | 5/2010 |
| JP | 2013-8329 | 1/2013 |

\* cited by examiner

*Primary Examiner* — Azam Cheema
(74) *Attorney, Agent, or Firm* — Fujitsu Patent Center

(57) ABSTRACT

A matching apparatus sets windows within match data, the windows each having a width larger than that in a window width condition defined in a query, and further sets windows each satisfying an event condition of a window defined in the query as temporary windows. Further, the matching apparatus checks sets of temporary windows against an interval condition and outputs events included in one or more sets of temporary windows each satisfying the interval condition, as a matching result.

6 Claims, 31 Drawing Sheets

FIG.3

| TIME | CLIENT ID | LOCA-TION | EVENT |
|---|---|---|---|
| 0 | 432 | 3F | A |
| 1 | 432 | 2F | B |
| 2 | 432 | 2F | A |
| 4 | 432 | 2F | B |
| 4 | 432 | 2F | C |
| 5 | 432 | 2F | C |
| 9 | 432 | 2F | B |
| 10 | 432 | 2F | A |
| 10 | 432 | 2F | C |
| 11 | 432 | 2F | A |
| 11 | 432 | 2F | B |
| 12 | 432 | 2F | A |
| 14 | 432 | 2F | B |
| 14 | 432 | 2F | D |
| 15 | 432 | 2F | E |
| 17 | 432 | 2F | C |
| 17 | 432 | 2F | E |
| 18 | 432 | 2F | E |
| 19 | 432 | 2F | D |

| TIME | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| A | A |   | A |   |   |   |   |   |   |   | A | A | A |   |   |   |   |   |   |   |   |
| B |   | B |   |   | B |   |   |   |   | B |   | B |   |   | B |   |   |   |   |   |   |
| C |   |   |   |   | C | C |   |   |   |   | C |   |   |   |   |   |   | C |   |   |   |
| D |   |   |   |   |   |   |   |   |   |   |   |   |   |   | D |   |   |   |   | D |   |
| E |   |   |   |   |   |   |   |   |   |   |   |   |   |   |   | E |   | E | E |   |   |

| TIME | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| A | A | | A | | | | | | | | A | A | A | | | | | | | | |
| B | | B | | | B | | | | B | B | B | | | | B | | | | | | |
| C | | | | | C | C | | | | | C | | | | | | | C | | | |
| D | | | | | | | | | | | | | | | | | | | | D | |
| E | | | | | | | | | | | | | | | | E | | E | E | | |

- 301 ■ (0, A), (1, B), (4, C) Not good
- 302 ■ (0, A), (1, B), (5, C) Not good
- 303 ■ (0, A), (4, B) Not good
- 304 ■ (2, A), (1, B), (4, C), (14, D) Not good
- 305 ■ (2, A), (1, B), (5, C) Not good
- 306 ■ (2, A), (4, B), (4, C), (14, D), (15, E) Good
- 307 ■ (2, A), (4, B), (4, C), (14, D), (17, E) Not good
- 308 ■ (2, A), (4, B), (4, C), (14, D), (18, E) Not good
- 309 ■ (2, A), (4, B), (5, C), (14, D), (15, E) Good
- 310 ■ (2, A), (4, B), (5, C), (14, D), (17, E) Not good
- 311 ■ (2, A), (4, B), (5, C), (14, D), (18, E) Not good

400

- 401 ■ (10, A), (9, B), (10, C), (19, D), (17, E) Good
- 402 ■ (10, A), (9, B), (10, C), (19, D), (18, E) Good
- 403 ■ (10, A), (11, B), (10, C), (19, D), (17, E) Good
- 404 ■ (10, A), (11, B), (10, C), (19, D), (18, E) Good
- 405 ■ (10, A), (14, B) Not good
- 406 ■ (11, A), (9, B), (10, C), (19, D), (17, E) Good
- 407 ■ (11, A), (9, B), (10, C), (19, D), (18, E) Good
- 408 ■ (11, A), (11, B), (10, C), (19, D), (17, E) Good
- 409 ■ (11, A), (11, B), (10, C), (19, D), (18, E) Good
- 410 ■ (11, A), (14, B), (10, C) Not good
- 411 ■ (12, A), (9, B), (10, C), (19, D), (17, E) Good
- 412 ■ (12, A), (9, B), (10, C), (19, D), (18, E) Good
- 413 ■ (12, A), (11, B), (10, C), (19, D), (17, E) Good
- 414 ■ (12, A), (11, B), (10, C), (19, D), (18, E) Good
- 415 ■ (12, A), (14, B), (10, C) Not good

FIG.30

| | 1/1 | 1/2 | 1/3 | 1/4 | 1/5 | 1/6 | 1/7 | 1/8 | 1/9 | 1/10 | 1/11 | 1/12 | 1/13 |
|---|---|---|---|---|---|---|---|---|---|---|---|---|---|
| ISSUE COUPON | | C | | | C | | | | | | | C | |
| PURCHASE MERCHANDISE | P | | | | | P | | | | | | | |
| VISIT STORE | V | V | | | V | V | | | V | | | V | |
| SEND DIRECT MAIL | | | | S | | | | | | | | | |
| RETURN MERCHANDISE | | | | | | | | | | | | | |

20

MATCHING METHOD AND COMPUTER-READABLE RECORDING MEDIUM

CROSS-REFERENCE TO RELATED APPLICATION(S)

This application is based upon and claims the benefit of priority of the prior Japanese Patent Application No. 2013-147955, filed on Jul. 16, 2013, the entire contents of which are incorporated herein by reference.

FIELD

The embodiments discussed herein are related to a matching method and the like.

BACKGROUND

It is important to improve efficiency of business activities, by analyzing, detecting, and reacting to phenomena each made up of a plurality of events having regularity. To detect events, a conventional technique is known by which one or more sets of events having predetermined regularity are detected from match data, by defining a query and performing a matching procedure on the query and the match data. The query is defined by event conditions each of which identifies an event in a one-to-one correspondence and an interval condition indicating an interval between the event conditions.

FIG. 29 is a first diagram of an example of a query used for explaining the conventional technique. A query 10 is an example of a query used for detecting a phenomenon where merchandise is purchased within three days of issuance of a coupon. In the example illustrated in FIG. 29, the query 10 includes nodes 11 and 12, while the node 11 represents an event condition "a coupon is issued", whereas the node 12 represents an event condition "merchandise is purchased". Further, the interval condition between the nodes 11 and 12 is "0 to 3 days".

FIG. 30 is a first drawing of an example of the match data used for explaining the conventional technique. In match data 20 in FIG. 30, each of the dates on which an event occurred is kept in correspondence with the corresponding event. The horizontal axis in FIG. 30 expresses dates. For instance, the example in FIG. 30 illustrates that the event "a coupon is issued" occurred on the dates 1/2, 1/5, and 1/12.

According to the conventional technique, when a matching procedure is performed on the query 10 and the match data 20, a set made up of the event "a coupon is issued" that occurred on the date "1/5" and the event "merchandise is purchased" that occurred on the date "1/6" is found in the search, because the interval between the event "a coupon is issued" and the event "merchandise is purchased" is "0", which satisfies the interval condition "0 to 3 days". Thus, according to the conventional technique, the set made up of the event "a coupon is issued" that occurred on the date "1/5" and the event "merchandise is purchased" that occurred on the date "1/6" is output as a detection result.

Next, a query having a window-type serial pattern will be explained. In a query having the window-type serial pattern, windows are connected in series, the windows each not defining the order of occurrence of events. FIG. 31 is a diagram of an example of a query having the window-type serial pattern. In a query 30 illustrated in FIG. 31, a window 31 and a window 32 are defined, while the window 31 and the window 32 are connected in series. For the interval between the window 31 and the window 32, an interval condition "5 to 8 minutes" is set.

The window 31 includes event conditions 31a, 31b, and 31c. The event condition 31a is a condition under which an event "pick up merchandise by hand" occurs. The event condition 31b is a condition under which an event "greeted by a salesperson" occurs. The event condition 31b is a condition under which an event "a limited-time sale is held" occurs.

The window width condition of the window 31 is 4 minutes. Thus, if events satisfying the event conditions 31a, 31b, and 31c occur during the time period between a certain start time and 4 minutes later, the condition of the window 31 is satisfied.

The window 32 includes event conditions 32a and 32b. The event condition 32a is a condition under which an event "purchase merchandise" occurs. The event condition 32b is a condition under which an event "price is reduced by a salesperson" occurs.

The window width condition of the window 32 is 3 minutes. Thus, if events satisfying the event conditions 32a and 32b occur during the time period between a certain start time and 3 minutes later, the condition of the window 32 is satisfied.

According to the conventional technique, the windows are set within the match data, and one or more sets of events each satisfying the conditions of the windows 31 and 32 are detected from the match data while shifting the windows. After that, according to the conventional technique, if the interval between a time period satisfying the condition of the window 31 and a time period satisfying the condition of the window 32 satisfies the interval condition, one or more sets of events in the match data that are included in the windows 31 and 32 are output as a search result of the query.

FIG. 32 is a drawing for explaining an exemplary method according to a conventional technique. A situation will be explained in which sets of events within match data 40 that satisfy the conditions of the query 30 illustrated in FIG. 31 are detected. In the match data 40 illustrated in FIG. 31, each of the times at which an event occurred is kept in correspondence with the corresponding event. The horizontal axis in the match data 40 expresses time. For the sake of convenience in explanation, in the match data 40, an event "pick up merchandise by hand" is referred to as "A", an event "greeted by a salesperson" is referred to as "B", "a limited-time sale is held" is referred to as "C", an event "purchase merchandise" is referred to as "D", and an event "price is reduced by a salesperson" is referred to as "E".

According to the conventional technique, within the match data 40, a window 50 corresponding to the condition of the window 31 in the query 30 and a window 60 corresponding to the condition of the window 32 are set. According to the conventional technique, it is judged whether the conditions of the windows 31 and 32 in the query 30 are satisfied, while each of the windows 50 and 60 is shifted by a unit time period at a time.

At the points in time when the start time of the window 50 is 1, 2, 7, 8, and 9, the condition of the window 31 in the query 30 is satisfied. The windows corresponding to the points in time when the start time of the window 50 is 1, 2, 7, 8, and 9 will be referred to as 50a, 50b, 50c, 50d, and 50e, respectively. Further, at the points in time when the start time of the window 60 is 13, 14, 17, and 18, the condition of the window 32 in the query 30 is satisfied. The windows corresponding to the points in time when the start time of the window 60 is 13, 14, 17, and 18 will be referred to as 60a, 60b, 60c, and 60d, respectively.

According to the conventional technique, for each of the combinations of the windows 50a to 50e and the windows 60a to 60e, it is judged whether the interval condition of the query 30 is satisfied thereby, so as to detect the events included in the sets of windows satisfying the interval condition. The sets of events detected in this manner satisfy the conditions of the query 30. In the example illustrated in FIG. 32, a set made up of the windows 50a and 60a and a set made up of the windows 50b and 60b each satisfy the conditions of the query 30. In addition, a set made up of the windows 50c and 60c, a set made up of the windows 50d and 60c, a set made up of the windows 50d and 60d, and a set made up of the windows 50e and 60d each satisfy the conditions of the query 30.

Patent Document 1: Japanese Laid-open Patent Publication No. 2004-46601

Patent Document 2: Japanese Laid-open Patent Publication No. 2009-134689

Patent Document 3: Japanese Laid-open Patent Publication No. 2010-108073

Patent Document 4: Japanese Laid-open Patent Publication No. 2013-8329

When the conventional technique described above is used, however, a problem remains where it is not possible to perform the matching procedure on the query and the match data at a high speed.

For example, according to the conventional technique, because a large number of windows satisfy the conditions of the windows in the query, the number of combinations of the windows is also large. Further, according to the conventional technique, it is judged whether the interval condition of the query is satisfied for each of the combinations. Thus, it is not possible to perform the matching procedure at a high speed.

In a first proposal, on the basis of a query, a computer sets second windows within match data in which each of events is kept in correspondence with the occurrence time of the event, the second windows each having a window width larger than that in a window width condition. Further, the computer judges whether the events in the match data included in the second windows and the interval between the second windows satisfy the event condition of the first window and the interval condition.

SUMMARY

According to an aspect of an embodiment, a matching method includes setting second windows within match data in which each of events is kept in correspondence with an occurrence time of the event, the second windows each having a window width larger than a window width in a window width condition, on a basis of a query in which an event condition is kept in correspondence with a first window, in which a predetermined window width condition is set with the first window, and in which two or more of the first windows are connected in series under a predetermined interval condition; and judging whether events in the match data included in the second windows and an interval between the second windows satisfy the event condition of the first window and the interval condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a drawing of an exemplary data structure of match data according to the first embodiment;

FIG. 4 is a drawing of a data image of the match data;

FIG. 10 is a drawing of an exemplary processing result of the temporary window constructing process according to the first embodiment;

FIG. 22 is a first drawing for explaining an interval condition judging process according to the second embodiment;

FIG. 26 is a drawing of an exemplary result of a combination expanding process;

FIG. 30 is a first drawing of an example of match data used for explaining the conventional technique;

DESCRIPTION OF EMBODIMENTS

Preferred embodiments of the present invention will be explained with reference to accompanying drawings. The present invention is not limited to these embodiments.

[a] First Embodiment

Figure 1:
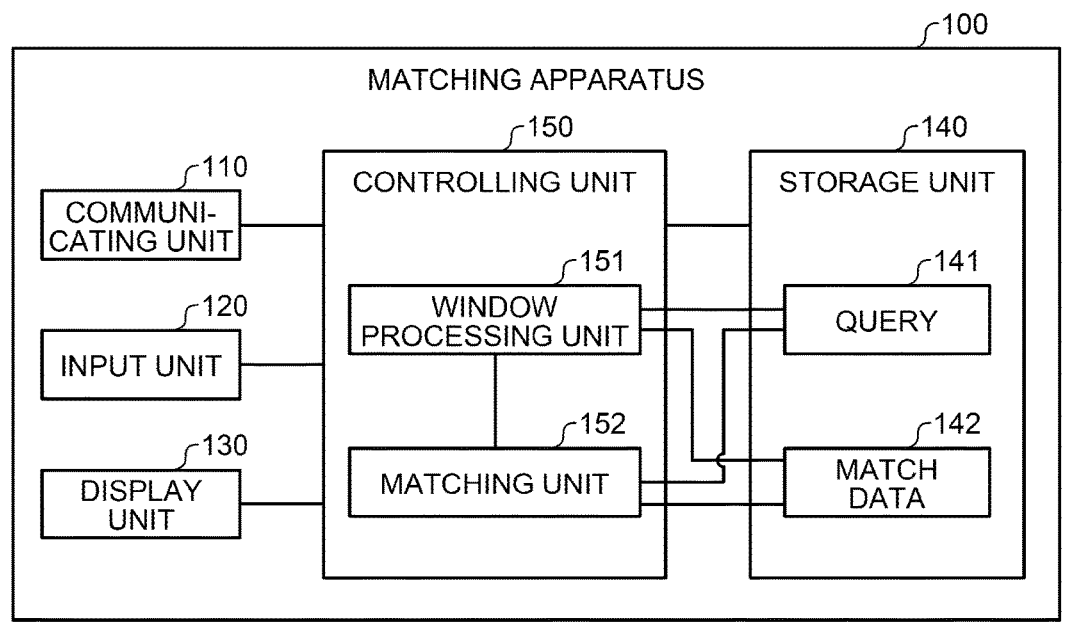
FIG. 1 is a functional block diagram of a configuration of a matching apparatus according to a first embodiment.

An exemplary configuration of a matching apparatus according to a first embodiment will be explained. FIG. 1 is a functional block diagram of the configuration of the matching apparatus according to the first embodiment. As illustrated in FIG. 1, a matching apparatus 100 includes a communicating unit 110, an input unit 120, a display unit 130, a storage unit 140, and a controlling unit 150.

The communicating unit 110 is a processing unit that performs communication with an external apparatus via a network. The communicating unit 110 corresponds to a communicating device.

The input unit 120 is an input device used for inputting information to the matching apparatus 100. For example, the input unit 120 corresponds to a keyboard and a mouse, a touch panel, or the like.

The display unit 130 is a display device used for displaying information that is output from the controlling unit 150. The display unit 130 corresponds to a liquid crystal monitor, a touch panel, or the like.

The storage unit 140 has a query 141 and match data 142. The storage unit 140 corresponds to a storage device configured with, for example, a semiconductor memory element such as a Random Access Memory (RAM), a Read-Only Memory (ROM), or a flash memory.

Figure 2:
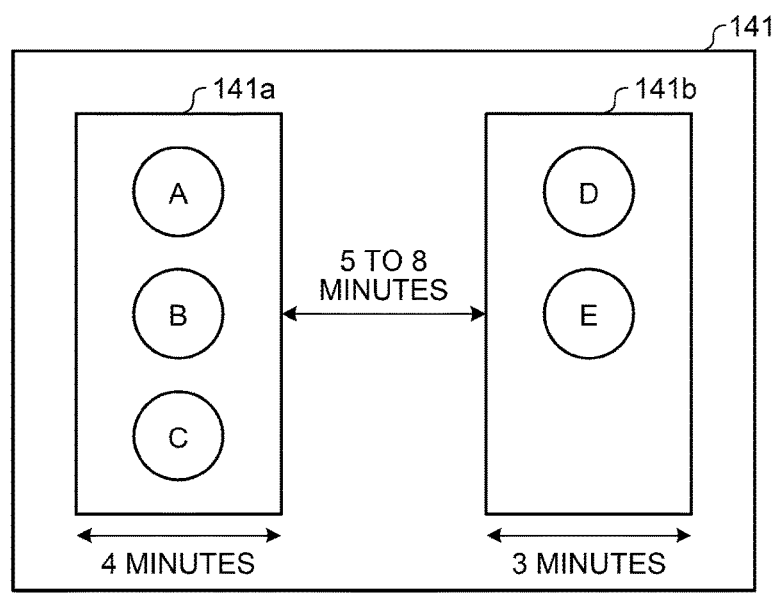
FIG. 2 is a diagram of an exemplary data structure of a query according to the first embodiment.

The query 141 is a window-type serial pattern query. A window-type serial pattern query is structured by connecting windows in series, the windows each not defining the order of occurrence of events. FIG. 2 is a diagram of an exemplary data structure of the query according to the first embodiment. As illustrated in FIG. 2, windows 141a and 141b are defined in the query 141, and the windows 141a and 141b are connected in series. An interval condition between the window 141a and the window 141b is "5 to 8 minutes".

The window 141a includes: an event condition under which an event "A" occurs; an event condition under which an event "B" occurs; and an event condition under which an event "C" occurs. A window width condition of the window 141a is 4 minutes. Thus, if the events A, B, and C occur in any order, during the time period between a certain start time and 4 minutes later, the condition of the window 141a is satisfied.

The window 141b includes: an event condition under which an event "D" occurs; and an event condition under which an event "E" occurs. A window width condition of the window 141b is 3 minutes. Thus, if the events D and E occur in any order, during the time period between a certain start time and 3 minutes later, the condition of the window 141b is satisfied.

The match data 142 is information subject to the matching procedure against the query 141 and includes information about occurrence times of events. FIG. 3 is a drawing of an exemplary data structure of the match data according to the first embodiment. As illustrated in FIG. 3, in the match data 142, times, client IDs, locations, and events are kept in correspondence with one another. Each of the times is information indicating the time at which the corresponding event occurred. Each of the client IDs is information that identifies the client relevant to the corresponding event, in a one-to-one correspondence. Each of the locations is information that identifies the location where the corresponding event occurred, in a one-to-one correspondence. Each of the events refers to the type of the event. For example, in FIG. 3, a record is registered indicating that the event "A" occurred in the location "3F" at the time "0" minute and that the event is relevant to the client whose client ID is "432".

A data image of the match data 142 in FIG. 3 is illustrated in FIG. 4. FIG. 4 is a drawing of the data image of the match data. In the description below, explanation will be provided as appropriate, with the use of data images such as the one in FIG. 4. The horizontal axis in FIG. 4 corresponds to time. In FIG. 4, for example, the event "A" occurs at the time "0".

Returning to the description of FIG. 1, the controlling unit 150 includes a window processing unit 151 and a matching unit 152. The controlling unit 150 may correspond to, for example, an integrated device such as an Application Specific Integrated Circuit (ASIC) or a Field Programmable Gate Array (FPGA). Alternatively, the controlling unit 150 may correspond to, for example, an electronic circuit such as a Central Processing Unit (CPU) or a Micro Processing Unit (MPU).

The window processing unit 151 is a processing unit that, by referring to the query 141, sets windows within the match data 142, the windows each having a larger width than that in the window width condition of the windows in the query 141. For example, within the match data 142, the window processing unit 151 sets windows each having a time width based on Expression (1). If a window that is set within the match data 142 satisfies the event condition of a window in the query 141, the window processing unit 151 determines the set window to be a temporary window.

Figure 5:
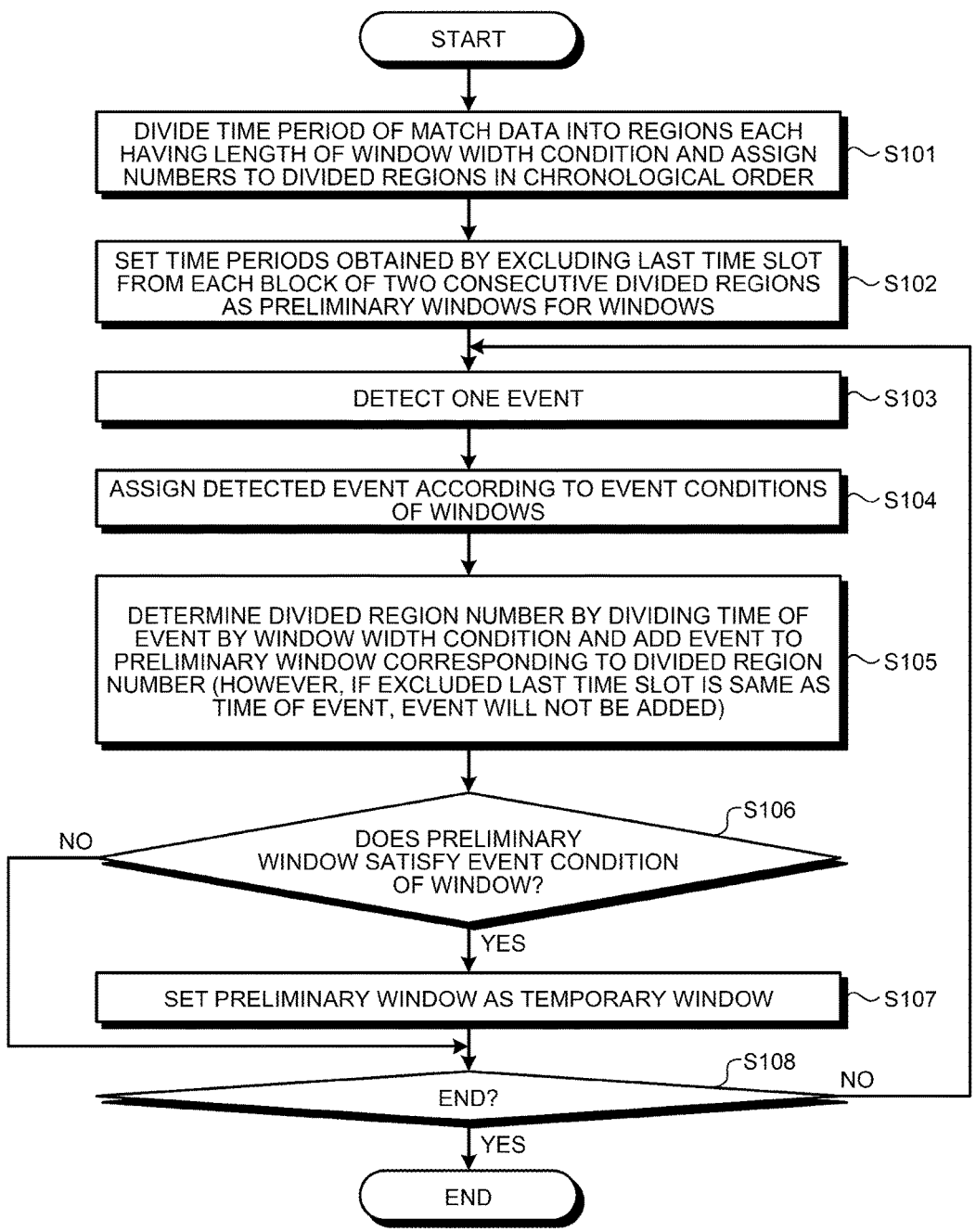
FIG. 5 is a flowchart of a processing procedure of a temporary window constructing process according to the first embodiment.

Next, a processing procedure performed by the window processing unit 151 to construct a temporary window will be explained. FIG. 5 is a flowchart of the processing procedure of the temporary window constructing process according to the first embodiment. As illustrated in FIG. 5, the window processing unit 151 divides the time period of the match data 142 into regions each having the length of a corresponding one of the window width conditions and assigns numbers to the divided regions in the chronological order (step S101).

The window processing unit 151 sets time periods obtained by excluding the last time slot from each block made up of two consecutive divided regions, as preliminary windows for the windows (step S102). The window processing unit 151 detects one event (step S103) and assigns the detected event according to the event conditions of the windows (step S104).

The window processing unit 151 calculates the value of a divided region number by dividing the time of the event by the window width condition and adds the event to the preliminary window corresponding to the divided region number (step S105). However, at step S105, if the last time slot excluded at step S102 is the same as the time of the event, the window processing unit 151 does not add the event.

The window processing unit 151 judges whether the preliminary window satisfies the event condition of the window (step S106). If the preliminary window does not satisfy the event condition of the window (step S106: No), the window processing unit 151 proceeds to step S108.

On the contrary, if the preliminary window satisfies the event condition of the window (step S106: Yes), the window processing unit 151 sets the preliminary window as a temporary window (step S107).

When the process is to be ended (step S108: Yes), the window processing unit 151 ends the window setting process. On the contrary, if the process is not to be ended (step S108: No), the window processing unit 151 proceeds to step S103.

Next, the temporary window constructing process performed by the window processing unit 151 will be explained, by using the query 141 illustrated in FIG. 2 and the match data 142 illustrated in FIG. 4 as examples. FIGS. 6 to 9 are drawings for explaining the temporary window constructing process according to the first embodiment.

Figure 6:
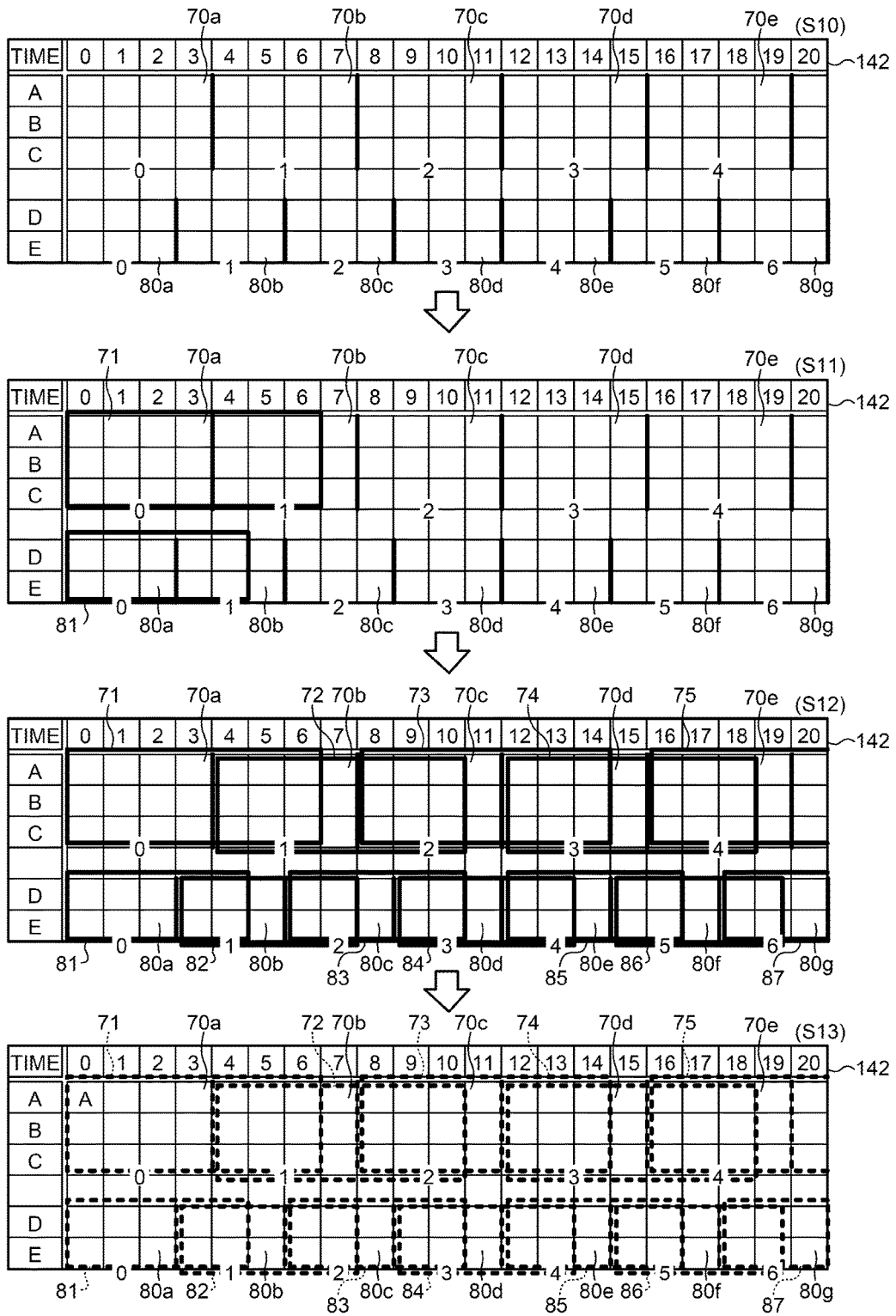
FIG. 6 is a first drawing for explaining the temporary window constructing process according to the first embodiment.

As illustrated in FIG. 6, the window processing unit 151 divides the time period of the match data 142 into regions by using the window width condition "4" of the window 141a of the query 141, so as to set divided regions 70a, 70b, 70c, 70d, and 70e. The window processing unit 151 sets divided region numbers 0 to 4 with the divided regions 70a to 70e. The window processing unit 151 divides the time period of the match data 142 into regions by using the window width condition "3" of the window 141b of the query 141, so as to set divided regions 80a, 80b, 80c, 80d, 80e, 80f, and 80g. The window processing unit 151 sets divided region numbers 0 to 6 with the divided regions 80a to 80g (step S10).

The window processing unit 151 sets time periods obtained by excluding the last time slot from each block made up of consecutive divided regions, as preliminary windows. The window processing unit 151 sets the time period obtained by excluding the last time slot "7" from a block made up of the divided regions 70a and 70b, as a preliminary window 71. The window processing unit 151 sets the time period obtained by excluding the last time slot "5" from the block made up of the divided regions 80a and 80b, as a preliminary window 81 (step S11).

The window processing unit 151 performs the same process as at step S11 on the other blocks made up of consecutive divided regions, so as to set preliminary windows 72, 73, 74, and 75 and preliminary windows 82, 83, 84, 85, 86, and 87 (step S12).

After setting the preliminary windows, the window processing unit 151 starts scanning the match data 142 for events. In the explanation below, when an event Y is detected at a time X, the situation will be expressed as "an event (X,Y) is detected", as appropriate. Further, the preliminary windows 71 to 75 each will satisfy the event condition, when the events A, B, and C corresponding to the event conditions A, B, and C defined in the window 141a of the query 141 illustrated in FIG. 2 are added thereto. The preliminary windows 81 to 87 each will satisfy the event condition, when the events D and E corresponding to the event conditions D and E defined in the window 141b of the query 141 are added thereto.

The window processing unit 151 detects an event (0,A). Because the time of the event A is "0", and the window width condition is "4", the divided region number is calculated as "0÷4=0". The event A is added to the preliminary window 71 including the divided region to which the same number as the divided region number is assigned. Note that the preliminary window 71 is not satisfying the event condition of the window 141a of the query 141 (step S13). The process at step S13 corresponds to the process at steps S105 and S106 in FIG. 5. The same applies to the processes described below.

Figure 7:
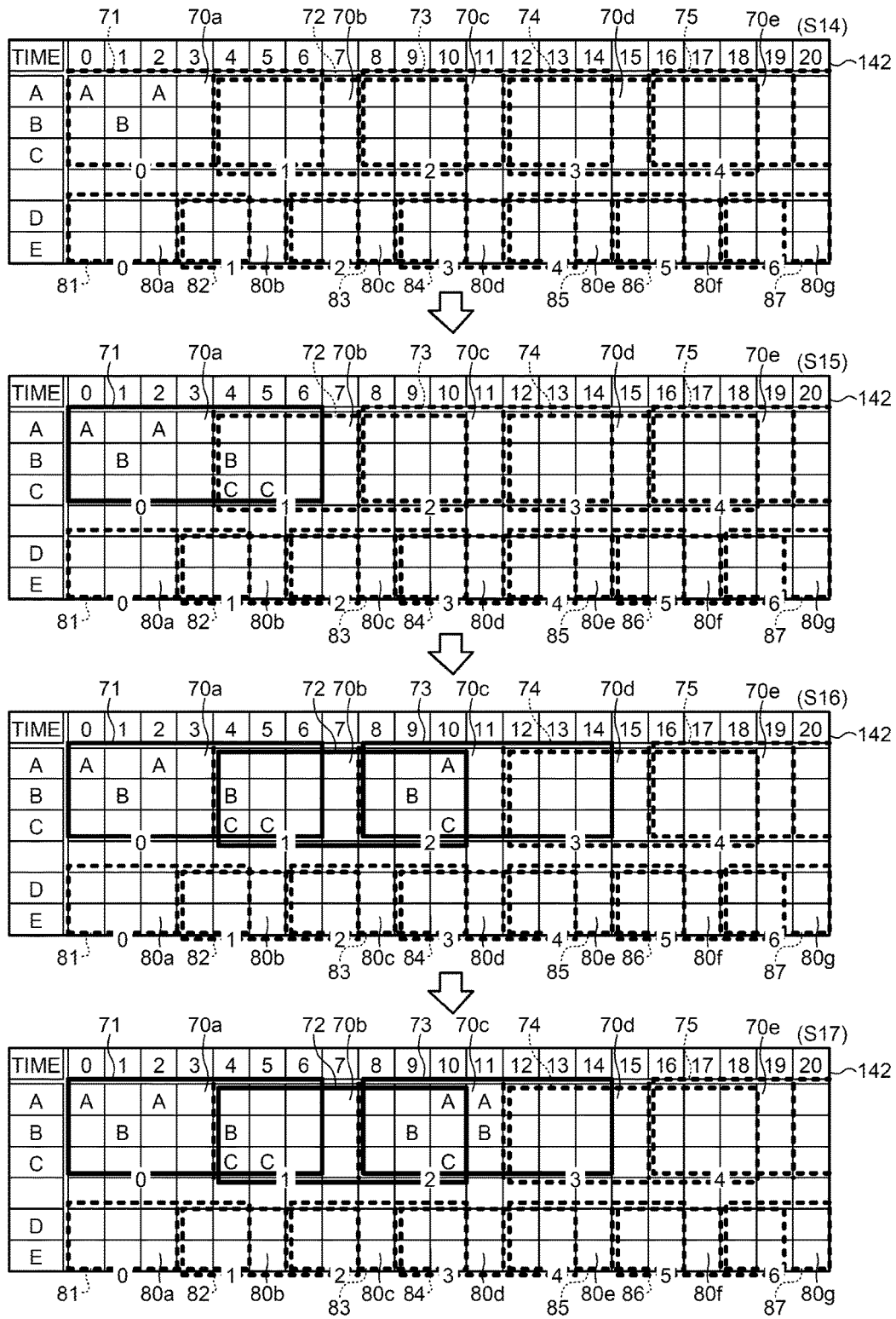
FIG. 7 is a second drawing for explaining the temporary window constructing process according to the first embodiment.

The explanation will be continued with reference to FIG. 7. The window processing unit 151 detects events (1,B) and (2,A). The divided region number corresponding to each of the events (1,B) and (2,A) is "0". Thus, the window processing unit 151 registers the events A and B into the preliminary window 71. Note that the preliminary window 71 is not satisfying the event condition of the window 141a of the query 141 (step S14).

The window processing unit 151 detects events (4,B), (4,C) and (5,C). The divided region number corresponding to each of the events (4,B), (4,C), and (5,C) is "1". The window processing unit 151 registers the events B, C, and C into the preliminary windows 71 and 72 corresponding to the divided region number "1". Because the preliminary window 71 satisfies the event condition of the window 141a of the query 141, the window processing unit 151 registers the preliminary window 71 as a temporary window. Note that the preliminary window 72 is not satisfying the event condition of the window 141a of the query 141 (step S15).

The window processing unit 151 detects events (9,B), (10,A) and (10,C). The divided region number corresponding to each of the events (9,B), (10,A) and (10,C) is "2". The window processing unit 151 registers the events B, A, and C into the preliminary windows 72 and 73 corresponding to the divided region number "2". Because the windows 72 and 73 each satisfy the event condition of the window 141a of the query 141, the window processing unit 151 registers the preliminary windows 72 and 73 as temporary windows (step S16).

The window processing unit 151 detects events (11,A) and (11,B). The divided region number corresponding to each of the events (11,A) and (11,B) is "2". Also, the events (11,A) and (11,B) are both at the last time slot of the divided region 70c. Thus, the window processing unit 151 adds the events A and B only to the temporary window 73 (step S17).

Figure 8:
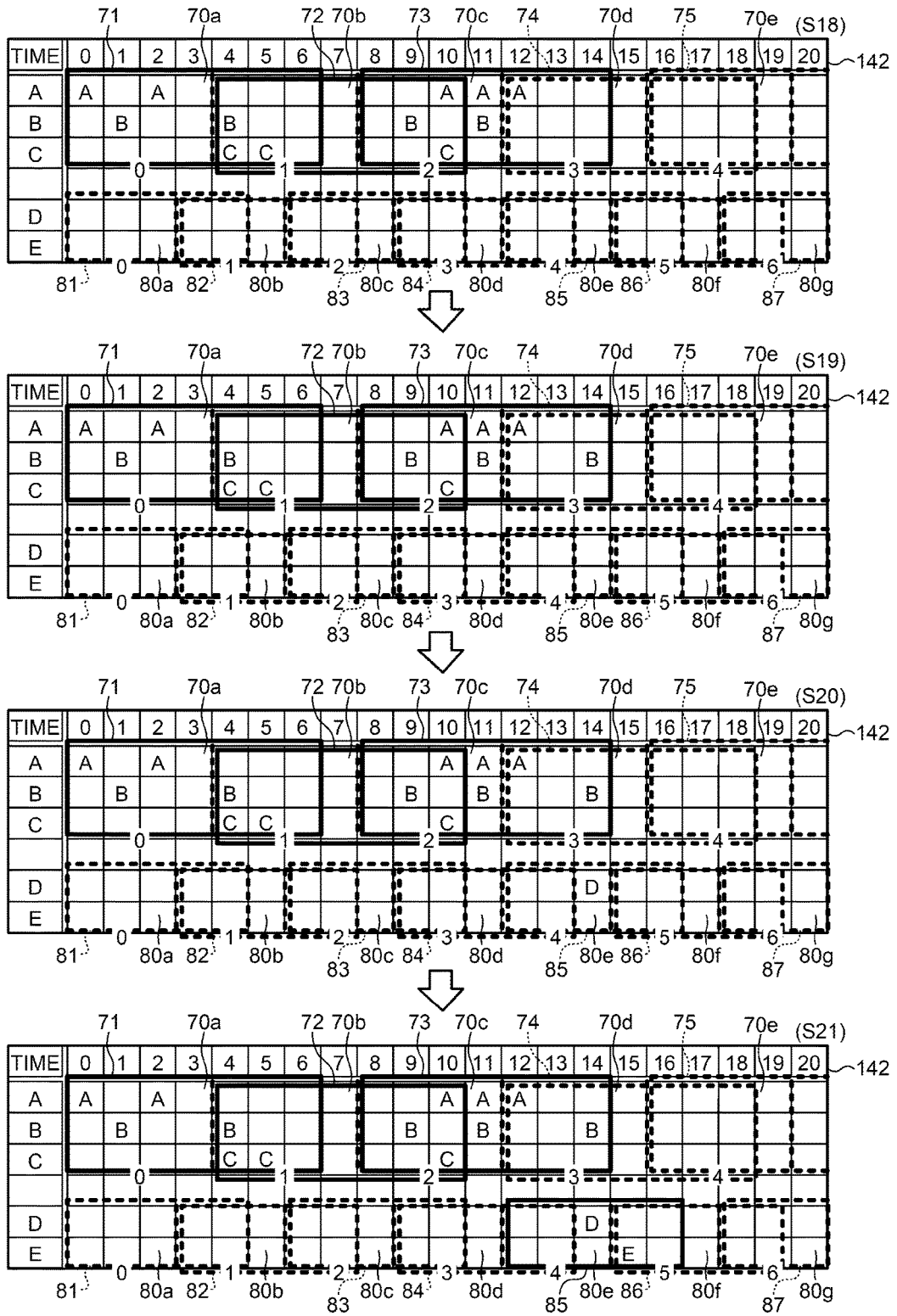
FIG. 8 is a third drawing for explaining the temporary window constructing process according to the first embodiment.

The explanation will be continued with reference to FIG. 8. The window processing unit 151 detects an event (12,A). The divided region number corresponding to the event (12,A) is "3". The window processing unit 151 adds the event A to the temporary window 73 and the preliminary window 74 corresponding to the divided region number "3". The preliminary window 74 is not satisfying the event condition of the window 141a of the query 141 (step S18).

The window processing unit 151 detects an event (14,B). The divided region number corresponding to the event (14,B) is "3". The window processing unit 151 adds the event B to the temporary window 73 and the preliminary window 74 corresponding to the divided region number "3". The preliminary window 74 is not satisfying the event condition of the window 141a of the query 141 (step S19).

The window processing unit 151 detects an event (14,D). The divided region number corresponding to the event (14,D) is "3". Because the event (14,D) is at the last time slot of the divided region 80e, the window processing unit 151 adds the event D only to the preliminary window 85. The window 85 is not satisfying the event condition of the window 141b of the query 141 (step S20).

The window processing unit 151 detects an event (15,E). The divided region number corresponding to the event (15,E) is "3". The window processing unit 151 adds the event E to the preliminary windows 85 and 86 corresponding to the divided region number "3". Because the preliminary window 85 satisfies the event condition of the window 141b of the query 141, the window processing unit 151 registers the preliminary window 85 as a temporary window 85. The preliminary window 86 is not satisfying the event condition of the window 141b of the query 141 (step S21).

Figure 9:
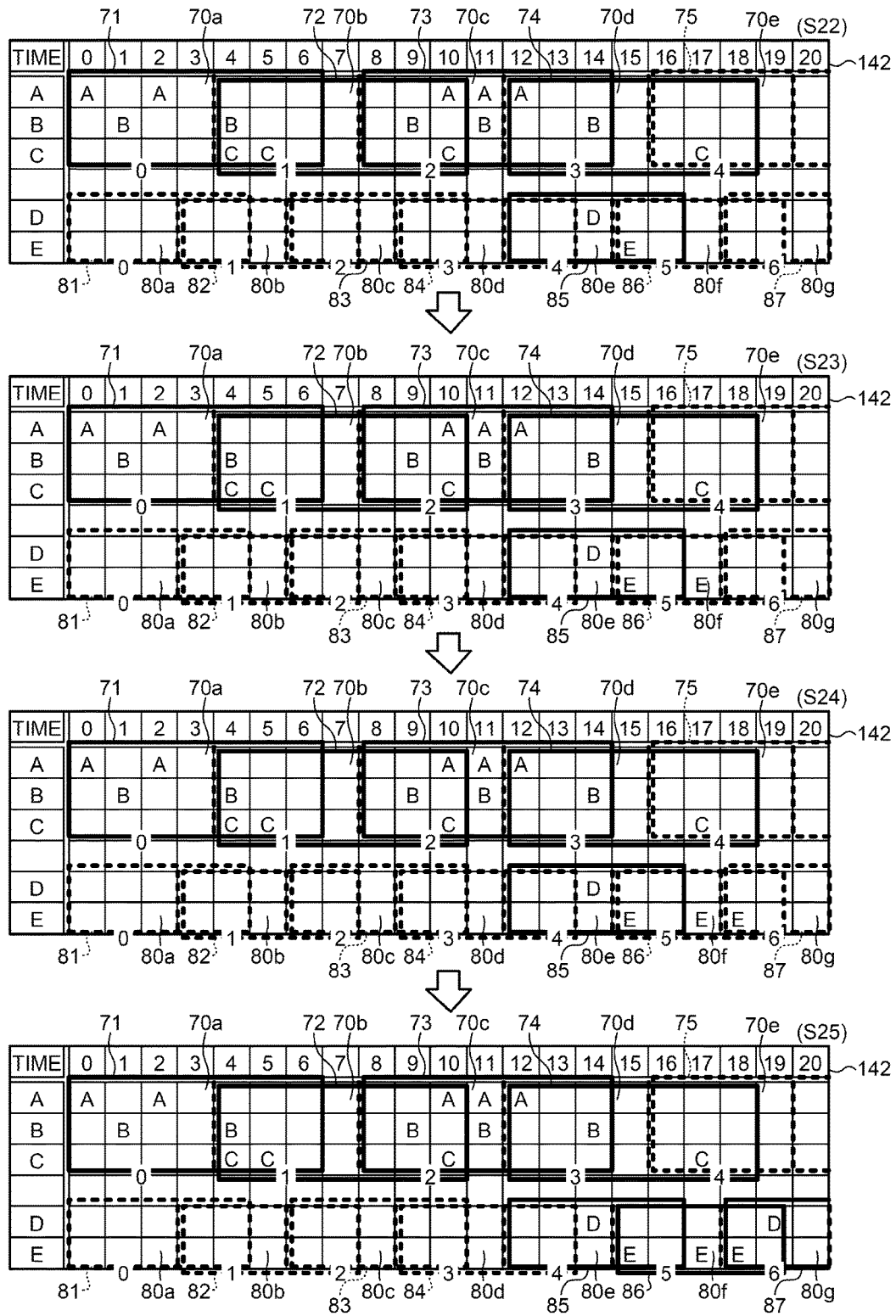
FIG. 9 is a fourth drawing for explaining the temporary window constructing process according to the first embodiment.

The explanation will be continued with reference to FIG. 9. The window processing unit 151 detects an event (17,C). The divided region number corresponding to the event (17,C) is "3". The window processing unit 151 adds the event C to the preliminary windows 74 and 75 corresponding to the divided region number "3". Because the preliminary window 74 satisfies the event condition of the window 141b of the query 141, the window processing unit 151 registers the preliminary window 74 as a temporary window 74. The preliminary window 75 is not satisfying the event condition of the window 141b of the query 141 (step S22).

The window processing unit 151 detects an event (17,E). The divided region number corresponding to the event (17,E) is "5". Because the events (17,E) is at the last time slot of the divided region 80f, the window processing unit 151 registers the event E only into the preliminary window 86. The preliminary window 86 is not satisfying the event condition of the window 141b of the query 141 (step S23).

The window processing unit 151 detects an event (18,E). The divided region number corresponding to the event (18,E) is "6". The window processing unit 151 adds the event E to the preliminary windows 86 and 87 corresponding to the divided region number "6". The preliminary windows 86 and 86 are not satisfying the event condition of the window 141b of the query 141 (step S24).

The window processing unit 151 detects an event (19,D). The divided region number corresponding to the event (19,D) is "6". The window processing unit 151 adds the event D to the preliminary windows 86 and 87 corresponding to the divided region number "6". Because the preliminary windows 86 and 87 satisfy the event condition of the window 141b of the query 141, the window processing unit 151 registers the preliminary windows 86 and 87 as temporary windows (step S25).

As explained with reference to FIGS. 6 to 9, as a result of the processes performed by the window processing unit 151, the temporary windows 71, 72, 73, and 74 and the temporary windows 85, 86, and 87 are registered. FIG. 10 is a drawing of an exemplary processing result of the temporary window constructing process according to the first embodiment. The window processing unit 151 outputs the processing result to the matching unit 152.

The matching unit 152 is a processing unit that detects one or more sets of events each satisfying the conditions of the query 141, on the basis of the processing result from the window processing unit 151. When it is assumed that the processing result from the window processing unit 151 is as illustrated in FIG. 10, the matching unit 152 determines one or more sets of temporary windows each satisfying the interval condition "5 to 8 minutes" of the query 141, from among the combinations of the temporary windows 71 to 74 and the temporary windows 85 to 87.

The combinations of temporary windows each satisfying the interval condition "5 to 8 minutes" of the query 141 are: a set made up of the temporary window 71 and the temporary window 85; a set made up of the temporary window 72 and the temporary window 86; and a set made up of the temporary window 72 and the temporary window 87.

Thus, the matching unit 152 outputs, as a matching result, a set made up of the types of the events and the times thereof included in the set made up of the temporary windows 71 and 85. Further, the matching unit 152 outputs, as another matching result, a set made up of the types of the events and the times thereof included in the set made up of the temporary windows 72 and 86. Furthermore, the matching unit 152 outputs, as yet another matching result, a set made up of the types of the events and the times thereof included in the set made up of the temporary windows 72 and 87.

Figure 11:
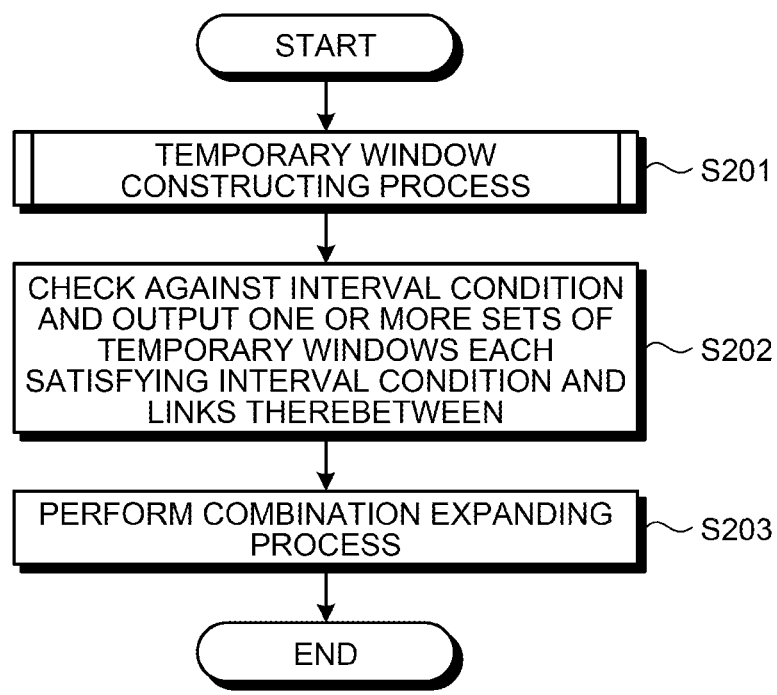
FIG. 11 is a flowchart of a processing procedure performed by the matching apparatus according to the first embodiment.

Next, a processing procedure performed by the matching apparatus 100 according to the first embodiment will be explained. FIG. 11 is a flowchart of the processing procedure performed by the matching apparatus according to the first embodiment. As illustrated in FIG. 11, the matching apparatus 100 performs the temporary window constructing process (step S201). The temporary window constructing process at step S201 is the process corresponding to the processing procedure illustrated in FIG. 5.

The matching apparatus 100 checks against the interval condition and outputs one or more sets of temporary windows each satisfying the interval condition and one or more links therebetween (step S202). The matching apparatus 100 performs a combination expanding process (step S203). For example, at step S203, the matching apparatus 100 outputs one or more sets of events included in the one or more sets of temporary windows each satisfying the interval condition.

Although detailed explanation will be omitted for now, the matching apparatus 100 performs the combination expanding process on the events included in the temporary windows satisfying the interval condition. With respect to each of the combinations of the events, the matching apparatus 100 checks to see if all the conditions of the query 141 are satisfied. If all the conditions of the query 141 are satisfied, the matching apparatus 100 outputs such sets of events. The details of the combination expanding process will be explained in the description of a second embodiment.

Next, advantageous effects of the matching apparatus 100 according to the first embodiment will be explained. Within the match data 142, the matching apparatus 100 sets the windows larger than the window width conditions defined in the query 141. The matching apparatus 100 sets the windows each satisfying the event condition of a window defined in the query 141, as the temporary windows. Further, the matching apparatus 100 checks the sets of temporary windows against the interval condition and outputs the events included in the sets of temporary windows each satisfying the interval condition, as the matching results. The matching apparatus 100 according to the first embodiment is able to reduce the number of combinations of windows against which the interval condition needs to be checked, compared to the example using the conventional technique. Thus, it is possible to perform the matching procedure on the query and the match data at a high speed. The first embodiment is explained by using the most basic example where the two windows are defined in the query; however, the present disclosure is applicable to a situation where three or more windows are defined in a query.

[b] Second Embodiment

Figure 12:
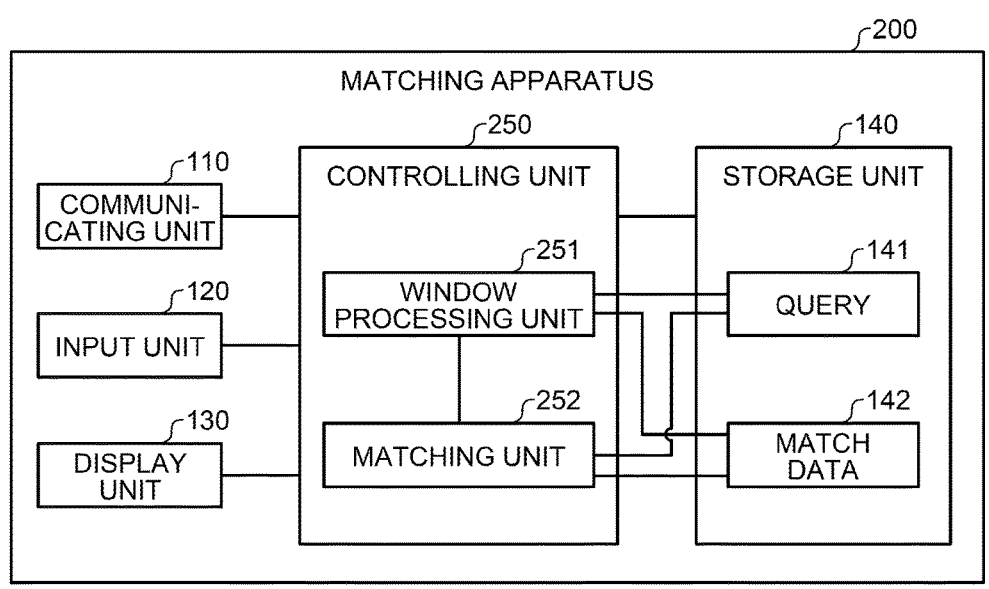
FIG. 12 is a functional block diagram of a configuration of a matching apparatus according to a second embodiment.

Next, an exemplary configuration of a matching apparatus according to the second embodiment will be explained. FIG. 12 is a functional block diagram of a configuration of the matching apparatus according to the second embodiment. As illustrated in FIG. 12, a matching apparatus 200 includes the communicating unit 110, the input unit 120, the display unit 130, the storage unit 140, and a controlling unit 250. The description of the communicating unit 110, the input unit 120, the display unit 130, and the storage unit 140 is the same as that of the communicating unit 110, the input unit 120, the display unit 130, and the storage unit 140 presented in the first embodiment. Thus, these constituent elements will be referred to by using the same reference numerals, and the explanation thereof will be omitted.

The controlling unit 250 includes a window processing unit 251 and the matching unit 252. The controlling unit 250 may correspond to, for example, an integrated device such as an ASIC or an FPGA. Alternatively, the controlling unit 250 may correspond to, for example, an electronic circuit such as a CPU or a MPU.

Figure 13:
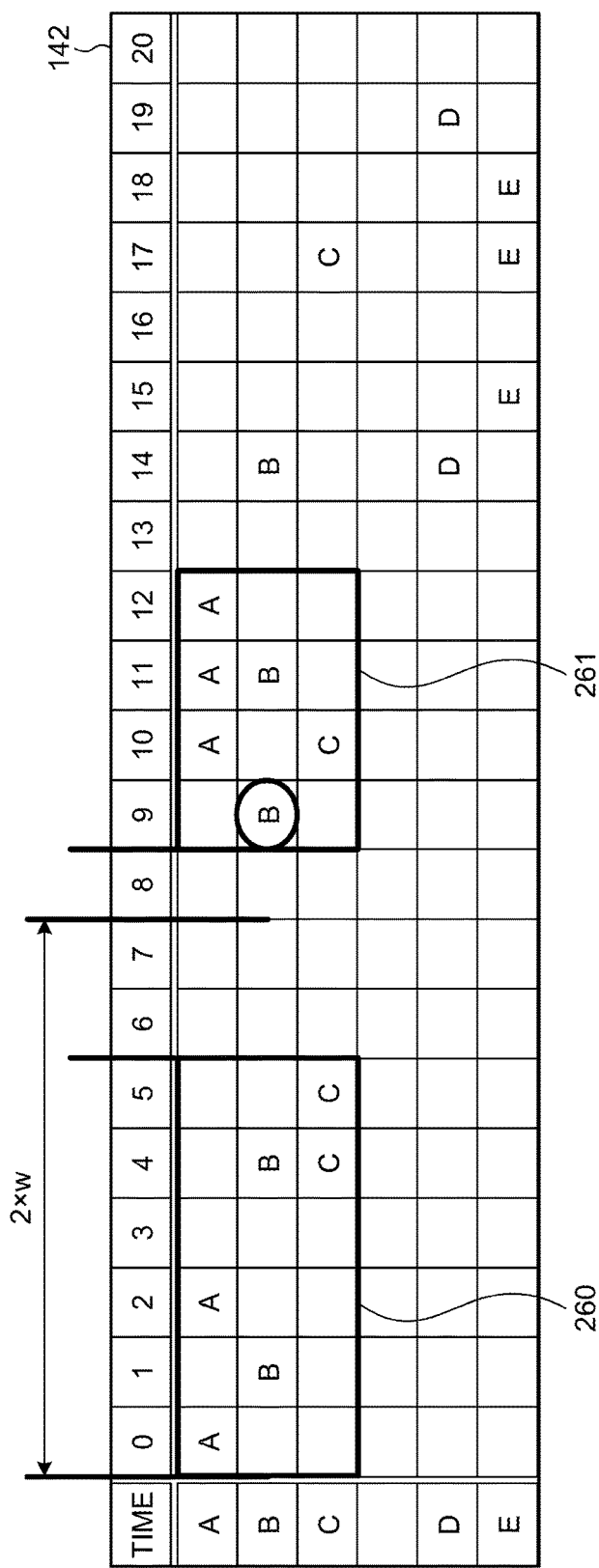
FIG. 13 is a drawing for explaining an exemplary process performed by a window processing unit according to the second embodiment.

The window processing unit 251 is a processing unit that, by referring to the query 141, sequentially sets temporary windows each having a larger width than that in the window width condition of the windows in the query 141. FIG. 13 is a drawing for explaining an exemplary process performed by the window processing unit according to the second embodiment. FIG. 13 illustrates an example in which the window width condition is "4".

The window processing unit 251 sets "w" to be a value equal to or larger than the window width condition of the query 141. The window processing unit 251 identifies an event that occurs first ("the first-occurring event") after "2×w" has elapsed since the start time of a window. The window processing unit 251 sequentially constructs temporary windows by determining the time at which a next event occurs past the time that is earlier by "w−1" than the first-occurring event, as the start time of the next temporary window.

In the following sections, the window processing unit 251 will be explained by using an example where the value of W is "4". As illustrated in FIG. 13, the window processing unit 251 identifies an event (9,B) that occurs first after "2×w" has elapsed since the start time "0" of a window 260. The window processing unit 251 identifies the time "9" at which a next event occurs first past the time "6" that is earlier by "w−1=3" than the identified event (9,B), to be the start time of the next window 261.

Figure 14:
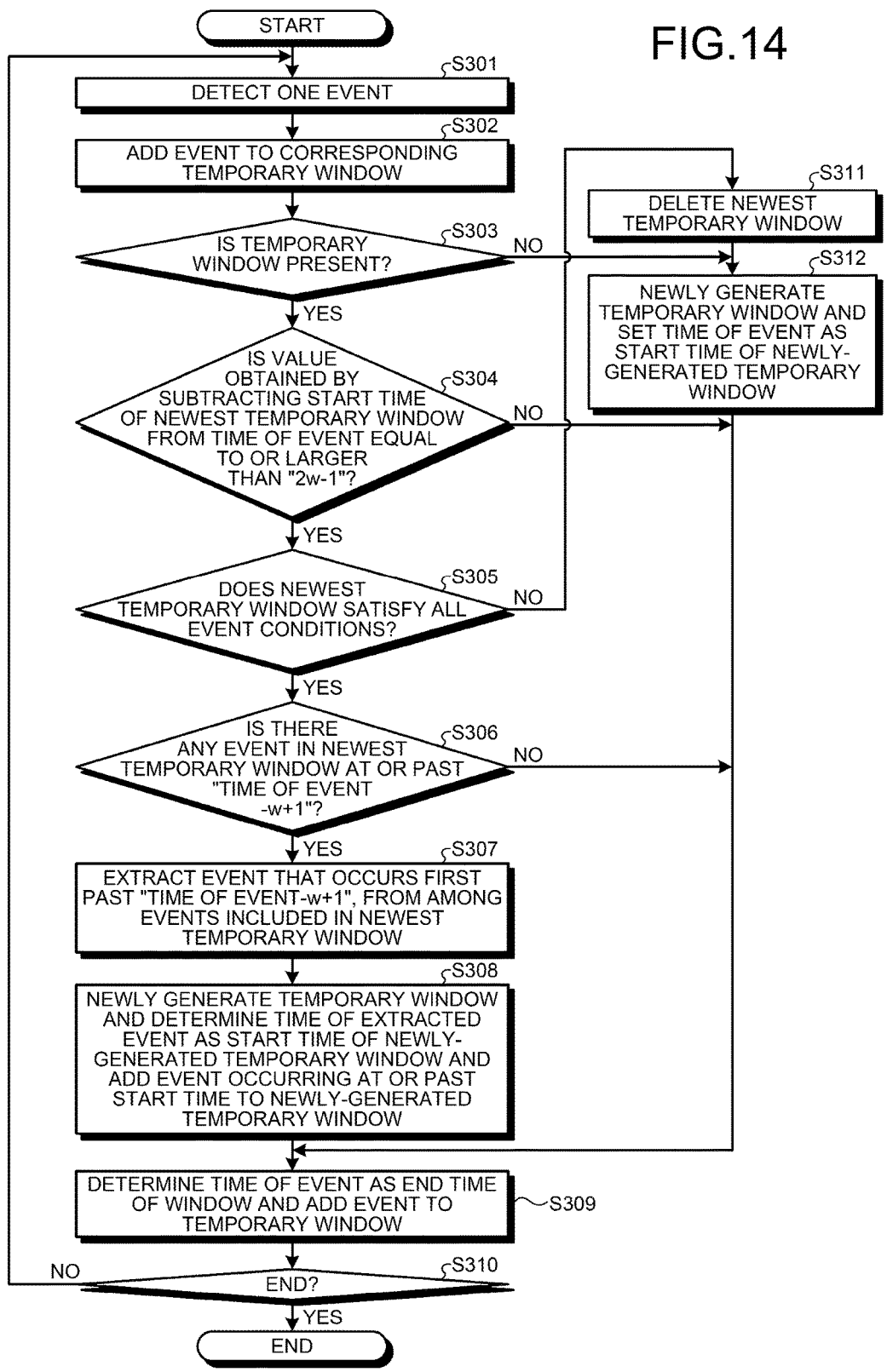
FIG. 14 is a flowchart of a processing procedure of a temporary window constructing process according to the second embodiment.

Next, a processing procedure performed by the window processing unit 251 to construct temporary windows will be explained. FIG. 14 is a flowchart of the processing procedure of the temporary window constructing process according to the second embodiment. As illustrated in FIG. 14, the window processing unit 251 detects one event (step S301) and adds the detected event to a corresponding temporary window (step S302).

If the temporary window is not present (step S303: No), the window processing unit 251 proceeds to step S312.

On the contrary, if the temporary window is present (step S303: Yes), the window processing unit 251 judges whether a value obtained by subtracting the start time of the newest temporary window from the time of the event is equal to or larger than "2w−1" (step S304). If the value obtained by subtracting the start time of the newest temporary window from the time of the event is not equal to or larger than "2w−1" (step S304: No), the window processing unit 251 proceeds to step S309.

If the value obtained by subtracting the start time of the newest temporary window from the time of the event is equal to or larger than "2w−1" (step S304: Yes), the window processing unit 251 judges whether the newest temporary window satisfies all the event conditions (step S305). If the newest temporary window does not satisfy all the event conditions (step S305: No), the window processing unit 251 proceeds to step S311.

If the newest temporary window satisfies all the event conditions (step S305: Yes), the window processing unit 251 proceeds to step S307. The window processing unit 251 judges whether there is any event in the newest temporary window at or past the time calculated as "the time of the event−w+1" (step S306). If there is no event in the newest temporary window at or past the time calculated as "the time of the event−w+1" (step S306: No), the window processing unit 251 proceeds to step S309.

If there are one or more events in the newest temporary window at or past the time calculated as "the time of the event−w+1" (step S306: Yes), the window processing unit 251 proceeds to step S307. The window processing unit 251 extracts an event that occurs first past the time calculated as "the time of the event−w+1", from among the events included in the newest temporary window (step S307).

The window processing unit 251 newly generates a temporary window, determines the time of the extracted event to be the start time of the newly-generated temporary window, and adds an event occurring at or past the start time to the newly-generated temporary window (step S308). The window processing unit 251 determines the time of the event to be the end time of the window and adds the event to the temporary window (step S309).

When the process is to be ended (step S310: Yes), the window processing unit 251 ends the temporary window constructing process. On the contrary, if the process is not to be ended (step S310: No), the window processing unit 251 proceeds to step S301.

At step S311, the window processing unit 251 deletes the newest temporary window (step S311). The window processing unit 251 newly generates a temporary window and sets the time of the event as the start time of the newly-generated temporary window (step S312), and the window processing unit 251 proceeds to step S309.

Figure 15:
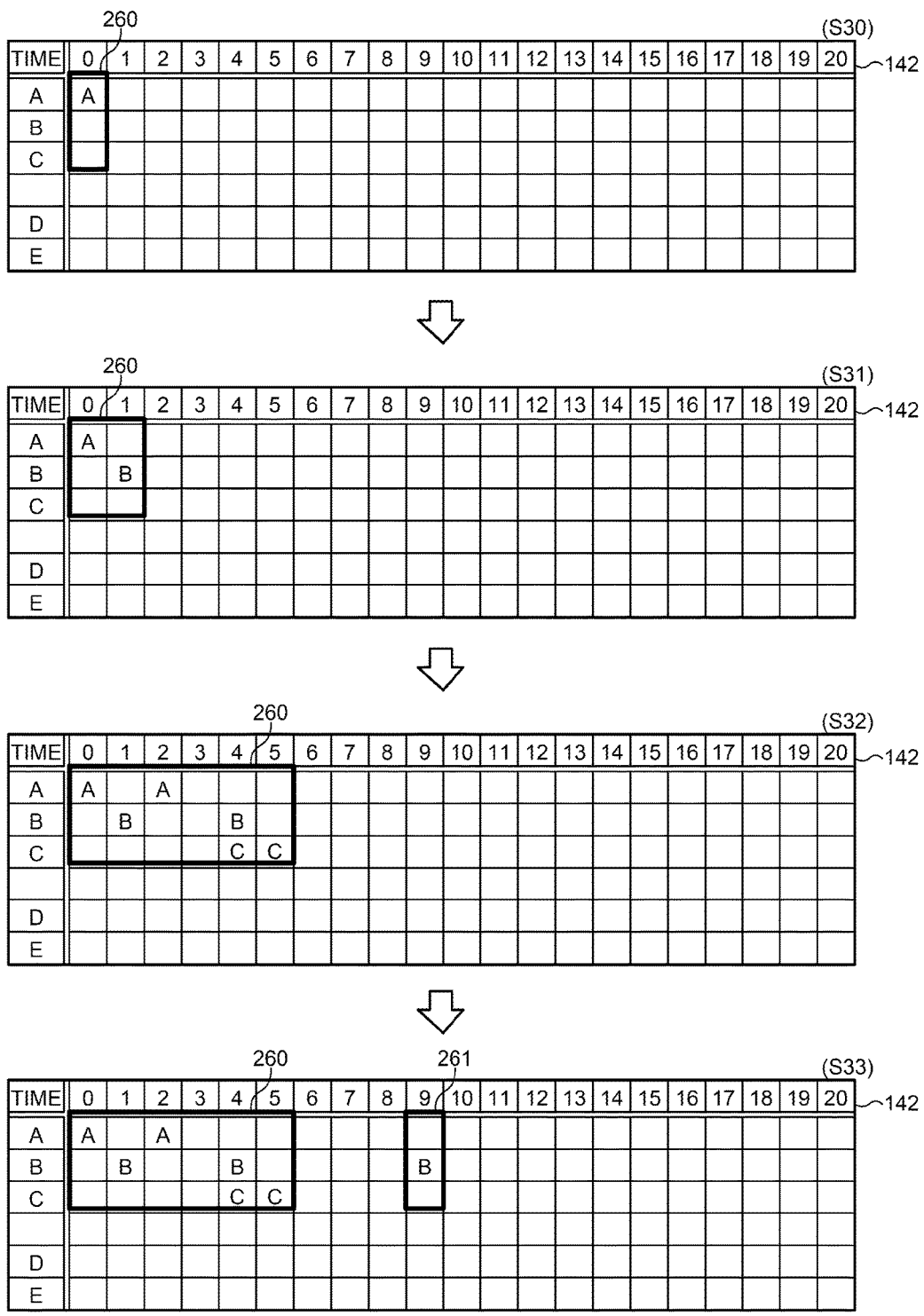
FIG. 15 is a first drawing for explaining the temporary window constructing process according to the second embodiment.
Figure 16:
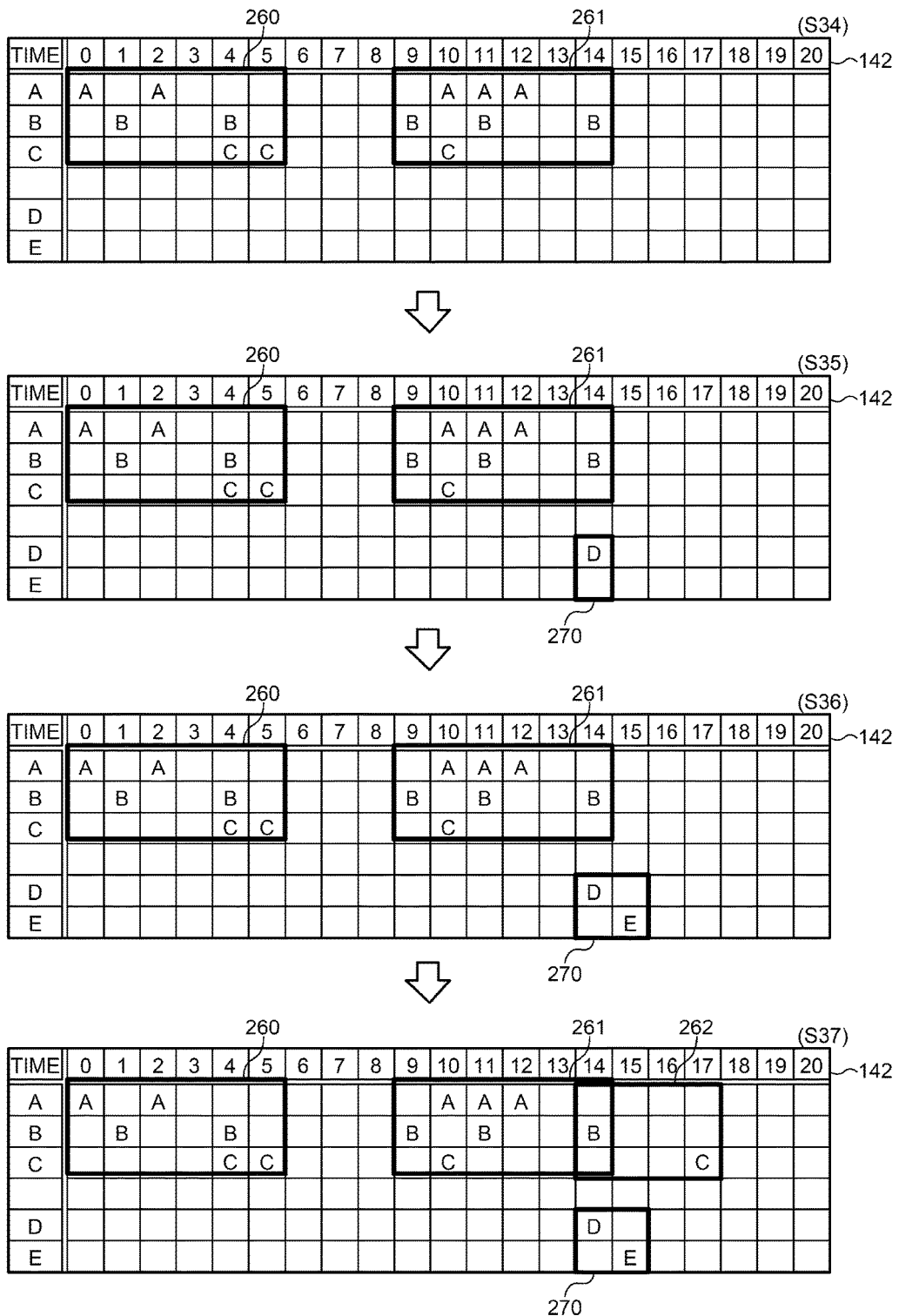
FIG. 16 is a second drawing for explaining the temporary window constructing process according to the second embodiment.
Figure 17:
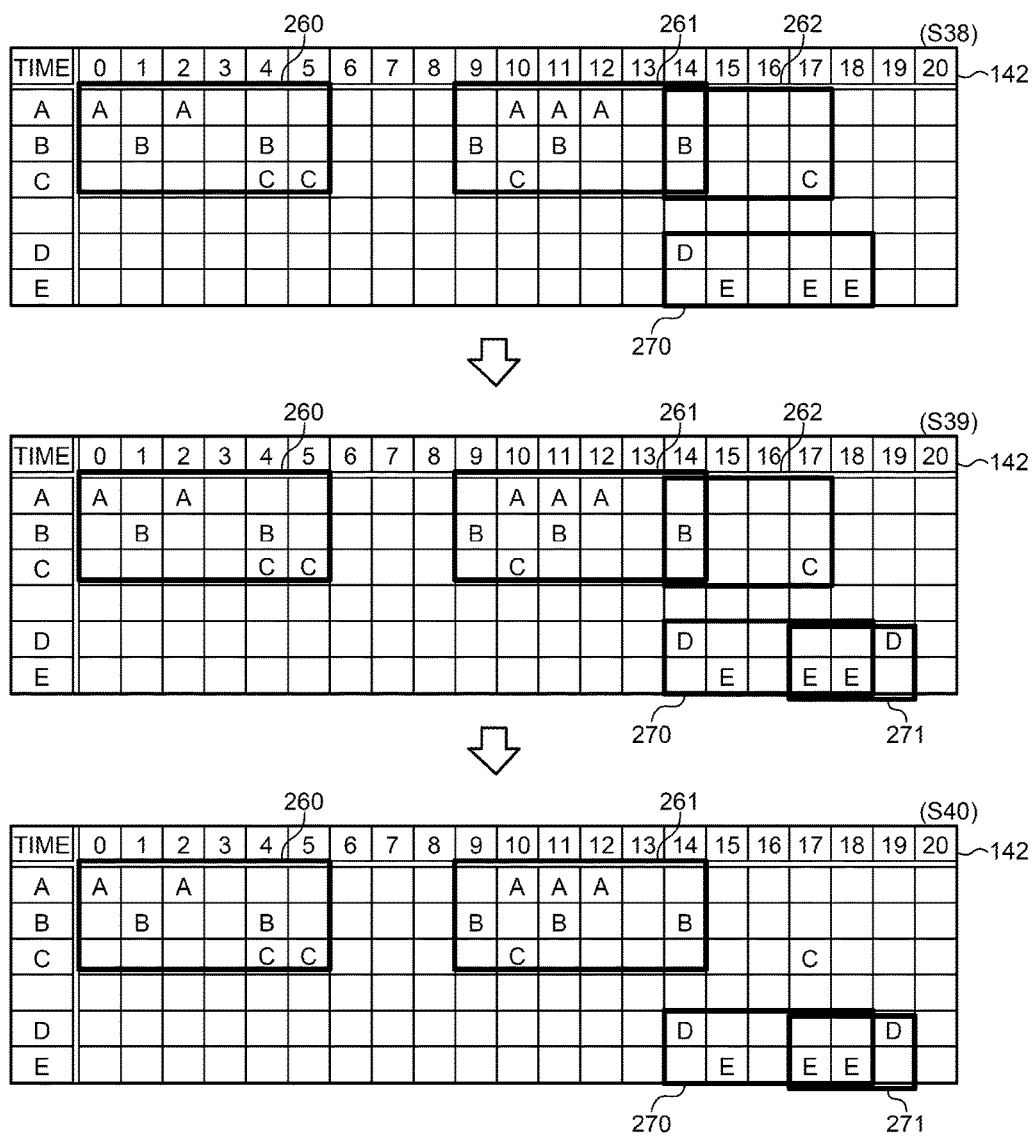
FIG. 17 is a third drawing for explaining the temporary window constructing process according to the second embodiment.

Next, the temporary window constructing process performed by the window processing unit 251 will be explained by using the query 141 illustrated in FIG. 2 and the match data 142 illustrated in FIG. 4 as examples. FIGS. 15 to 17 are drawings for explaining the temporary window constructing process according to the second embodiment. FIGS. 15 to 17 illustrate an example in which the value "w" of the window for the events A to C is "4", whereas the value "w" of the window for the events D and E is "3".

The explanation will be provided with reference to FIG. 15. The window processing unit 251 detects an event (0,A). The window processing unit 251 generates a temporary window 260. The window processing unit 251 adds the event A to the temporary window 260 (step S30).

The window processing unit 251 detects an event (1,B). The window processing unit 251 sets the time "1" of the event (1,B) as the end time of the temporary window 260. The window processing unit 251 adds the event B to the temporary window 260 (step S31).

The window processing unit 251 detects events (2,A), (4,B), (4,C), and (5,C). The window processing unit 251 sets the time "5" of the event (5,C) as the end time of the temporary window 260. The window processing unit 251 adds the events A, B, C, and C to the temporary window 260 (step S32).

The window processing unit 251 detects an event (9,B). The value obtained by subtracting the start time "0" of the newest temporary window 260 from the time of the event "9" of the event (9,B) is larger than "2w−1=7". In addition, the newest temporary window 260 satisfies all the event conditions. Further, no event is present in the newest temporary window 260 at or past the time calculated as "the time of the event '9' of the event (9,B)−w+1"="9−4+1=6". Thus, the window processing unit 251 generates a new temporary window 261 and sets the start time and the end time of the temporary window 261 as "9" (step S33).

The window processing unit 251 detects events (10,A), (10,C), (11,A), (11,B), (12,A), and (14,B). The window processing unit 251 sets the events A, C, A, B, A, and B in the newest temporary window 261. The window processing unit 251 sets the end time of the temporary window as "14" (step S34).

The window processing unit 251 detects an event (14,D). The window processing unit 251 generates a window 270. The window processing unit 251 adds the event D to the temporary window 270 (step S35).

The window processing unit 251 detects an event (15,E). The window processing unit 251 adds the event E to the temporary window 270 (step S36).

The window processing unit 251 detects an event (17,C). The value obtained by subtracting the start time "9" of the newest temporary window 261 from the time of the event "17" of the event (17,C) is larger than the value calculated as "2×2−1=7". The newest temporary window 261 satisfies all the event conditions. In addition, an event (14,B) is present in the newest temporary window 261 at or past the time calculated as "the time of the event '17' of the event (17,C)−w+1=17−4+1=14". Thus, the window processing unit 251 generates a new temporary window 262 and sets the start time "14" of the event (14,B) as the start time of the temporary window 262. Further, the window processing unit 251 adds the event (17,C) to the temporary window 262 and sets the time "17" of the event (17,C) as the end time of the temporary window 262 (step S37).

The explanation will be continued with reference to FIG. 17. The window processing unit 251 detects events (17,E) and (18,E). The window processing unit 251 adds the events E and E to the temporary window 270 (step S38).

The window processing unit 251 detects an event (19,D). The value obtained by subtracting the start time "14" of the newest temporary window 270 from the time of the event "19" of the event (19,D) is larger than the value calculated as "2×3−1=5". The newest temporary window 270 satisfies all the event conditions. Further, an event (17,E) is present in the newest temporary window 261 at or past the time calculated as "the time of the event '19' of the event (19,D)−w+1=17−3+1=15". Thus, the window processing unit 251 generates a new temporary window 271 and sets the start time of the event (17,E) as the start time of the temporary window 271. Further, the window processing unit 251 adds the events (18,E) and (19,D) to the temporary window 271 and sets the time "19" of the event (19,D) as the end time of the temporary window 271 (step S39).

The window processing unit 251 attempts to detect an event at or past the time 21, but no event is present. Thus, the newest temporary window 262 does not satisfy all the event conditions. The window processing unit 251 deletes the temporary window 262 (step S40).

By performing the processes illustrated in FIGS. 15 to 17 described above, the window processing unit 251 constructs the temporary windows 260 and 261 and the temporary windows 270 and 271. The window processing unit 251 outputs information about the constructed temporary windows to the matching unit 252.

Returning to the description of FIG. 12, the matching unit 252 is a processing unit that detects one or more sets of events each satisfying the conditions of the query 141 from the match data 142, on the basis of the temporary windows constructed by the window processing unit 251 and the query 141.

To check to see if each of the sets of temporary windows satisfies the interval condition of the query 141, the matching unit 252 takes the times of the events in the temporary windows into consideration, instead of using the end time, the start time, and the time interval of each of the sets of temporary windows. In the explanation below, with regard to each set of temporary windows, the temporary window that precedes the other will be referred to a preceding window, whereas the temporary window that follows the other will be referred to as a following window.

If the relationship between a preceding window and a following window satisfies a "minimum interval condition" and a "maximum interval condition", the matching unit 252 outputs the set made up of the preceding window and the following window.

Figure 18:
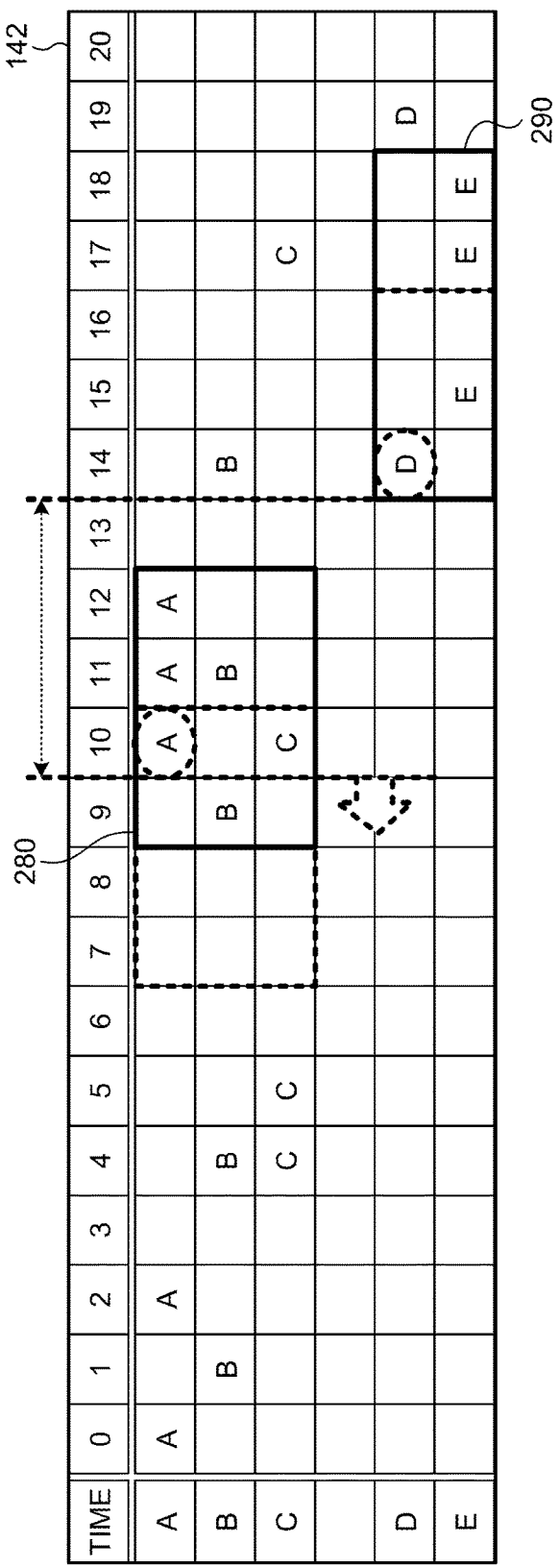
FIG. 18 is a drawing for explaining a minimum interval condition.

First, the minimum interval condition will be explained. If the "minimum interval" between a preceding window and a following window is larger than the minimum value of the interval condition, the matching unit 252 determines that the "minimum interval condition" is satisfied. FIG. 18 is a drawing for explaining the minimum interval condition.

With reference to FIG. 18, a window 280 will be referred to as a preceding window, whereas a window 290 will be referred to as a following window. From among the events included in the preceding window 280, the matching unit 252 identifies the time of the latest event among the first set of events satisfying the event condition to be a first reference time. Thus, the first reference time is "10".

From among the events included in the following window 290, the matching unit 252 identifies the time of the earliest event among the last set of events satisfying the event condition to be a second reference time. Thus, the second reference time is "14".

The matching unit 252 calculates the interval between the first reference time and the second reference time as the minimum interval. In the example illustrated in FIG. 18, the minimum interval is "4", which is equal to or smaller than the minimum value "4" of the interval condition. Thus, the matching unit 252 determines that the set made up of the temporary windows 280 and 290 does not satisfy the minimum interval condition. Hypothetically, if the first reference time were earlier than "9", the minimum interval condition would be satisfied.

Figure 19:
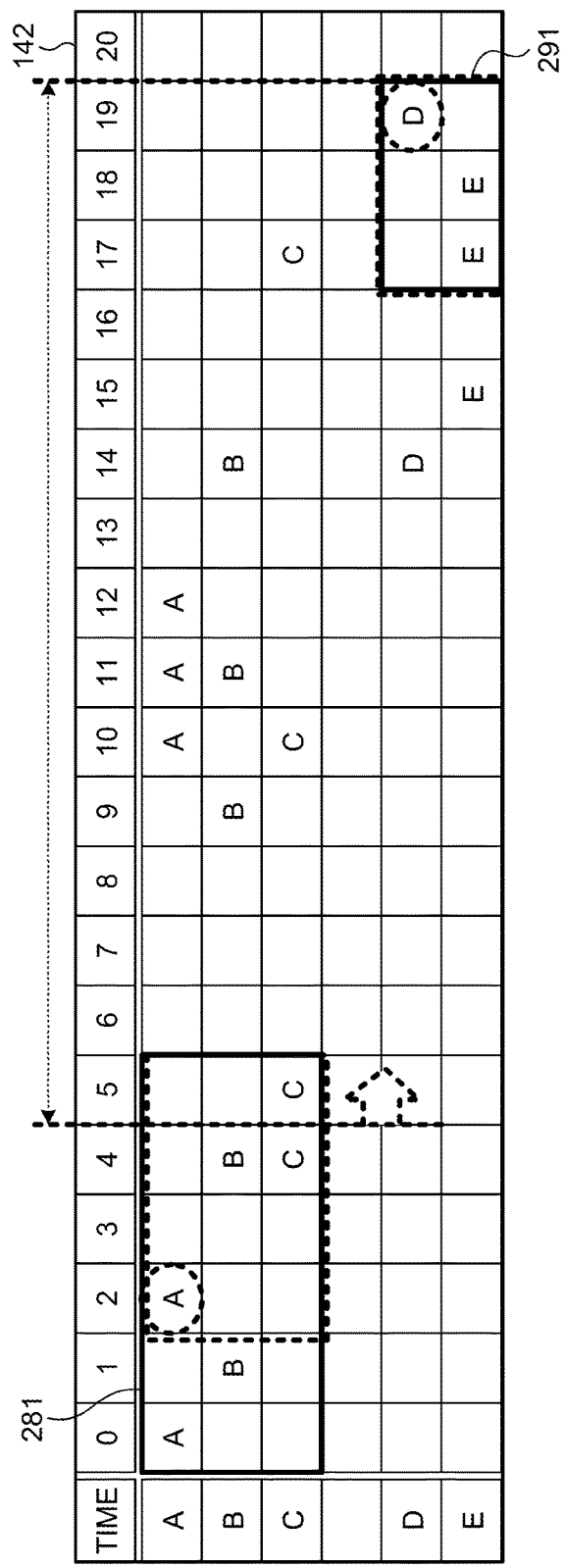
FIG. 19 is a drawing for explaining a maximum interval condition.

Next, the maximum interval condition will be explained. If the "maximum interval" between a preceding window and a following window is equal to or smaller than the sum of the maximum value of the interval condition, the preceding window width condition, and the following window width condition, the matching unit 252 determines that the "maximum interval condition" is satisfied. FIG. 19 is a drawing for explaining the maximum interval condition.

With reference to FIG. 19, a window 281 will be referred to as a preceding window, whereas a window 291 will be referred to as a following window. From among the events included in the preceding window 281, the matching unit 252 identifies the time of the earliest event among the last set of events satisfying the event condition to be a third reference time. Thus, the third reference time is "2".

The matching unit 252 identifies the time of the latest event among the first set of events included in the following window 291 to be a fourth reference time. Thus, the fourth reference time is "19".

The matching unit 252 calculates the interval between the third reference time and the fourth reference time as the maximum interval. In the example illustrated in FIG. 19, the maximum interval is "17". The sum of the maximum value "8" of the interval condition, the preceding window width "4", and the following window width "3" is "15". Thus, the matching unit 252 determines that the set made of up the temporary windows 281 and 291 does not satisfy the maximum interval condition. Hypothetically, if the third reference time were later than "5", the maximum interval condition would be satisfied.

Figure 20:
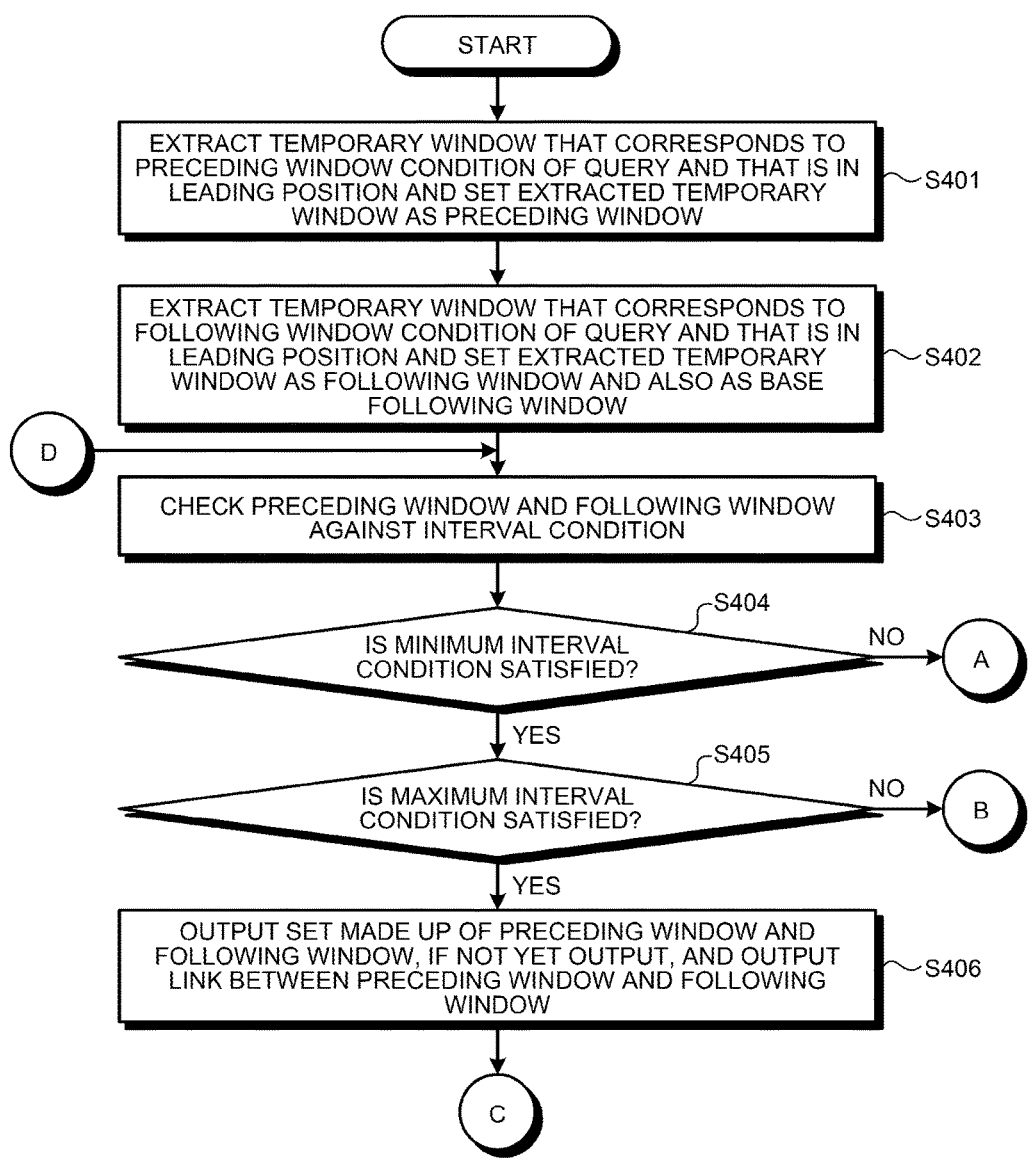
FIG. 20 is a first flowchart of a processing procedure of an interval condition judging process.
Figure 21:
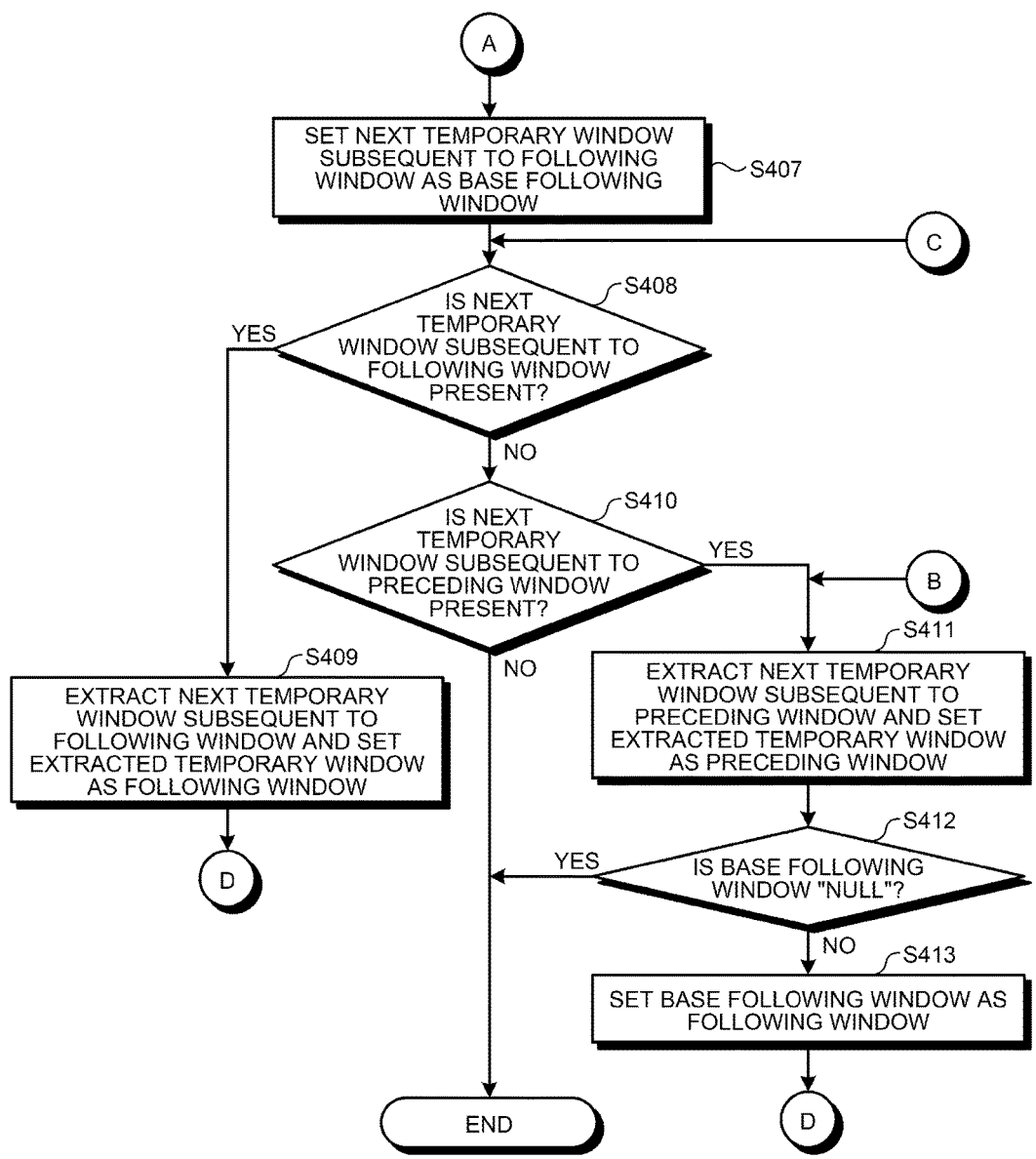
FIG. 21 is a second flowchart of the processing procedure of the interval condition judging process.

Next, a processing procedure performed by the matching unit 252 to judge the interval condition will be explained. FIGS. 20 and 21 are flowcharts of the processing procedure of the interval condition judging process. As illustrated in FIG. 20, the matching unit 252 extracts such a temporary window that corresponds to the condition of the preceding window in the query 141 and that is in a leading position and sets the extracted temporary window as a preceding window (step S401).

The matching unit 252 extracts such a temporary window that corresponds to the condition of the following window in the query 141 and that is in a leading position and sets the extracted temporary window as a following window and also sets the extracted temporary window as a base following window (step S402).

The matching unit 252 checks the preceding window and the following window against the interval condition (step S403). If the minimum interval condition is not satisfied (step S404: No), the matching unit 252 proceeds to step S407 in FIG. 21.

On the contrary, if the minimum interval condition is satisfied (step S404: Yes), the matching unit 252 judges if the maximum interval condition is satisfied (step S405). If the maximum interval condition is not satisfied (step S405: No), the matching unit 252 proceeds to step S411 in FIG. 21.

On the contrary, if the maximum interval condition is satisfied (step S405: Yes), the matching unit 252 proceeds to step S406. The matching unit 252 outputs the set made up of the preceding window and the following window, if the set has not been output yet, and further outputs a link between the preceding window and the following window (step S406). The matching unit 252 then proceeds to step S408 in FIG. 20.

The explanation will be continued with reference to FIG. 21. The matching unit 252 sets the next window subsequent to the following window as a base following window (step S407). If the next temporary window subsequent to the following window is present (step S408: Yes), the matching unit 252 extracts the next temporary window subsequent to the following window and sets the extracted temporary window as a following window (step S409) and proceeds to step S403 in FIG. 20.

On the contrary, if no next temporary window subsequent to the following window is present (step S408: No), the matching unit 252 judges whether the next temporary window subsequent to the preceding window is present (step S410). If no next temporary window subsequent to the preceding window is present (step S410: No), the matching unit 252 ends the process.

On the contrary, if the next temporary window subsequent to the preceding window is present (step S410: Yes), the matching unit 252 extracts the next temporary window subsequent to the preceding window and sets the extracted temporary window as a preceding window (step S411).

If the base following window is "NULL" (step S412: Yes), the matching unit 252 ends the process. If the base following window is not "NULL" (step S412: No), the matching unit 252 sets the base following window as a following window (step S413) and proceeds to step S403 in FIG. 20.

Next, an interval condition judging process performed by the matching unit 252 will be explained, by using the temporary window construction result illustrated in FIG. 17 and the query 141 illustrated in FIG. 2 as examples. FIGS. 22 to 25 are drawings for explaining the interval condition judging process according to the second embodiment.

Figure 22:
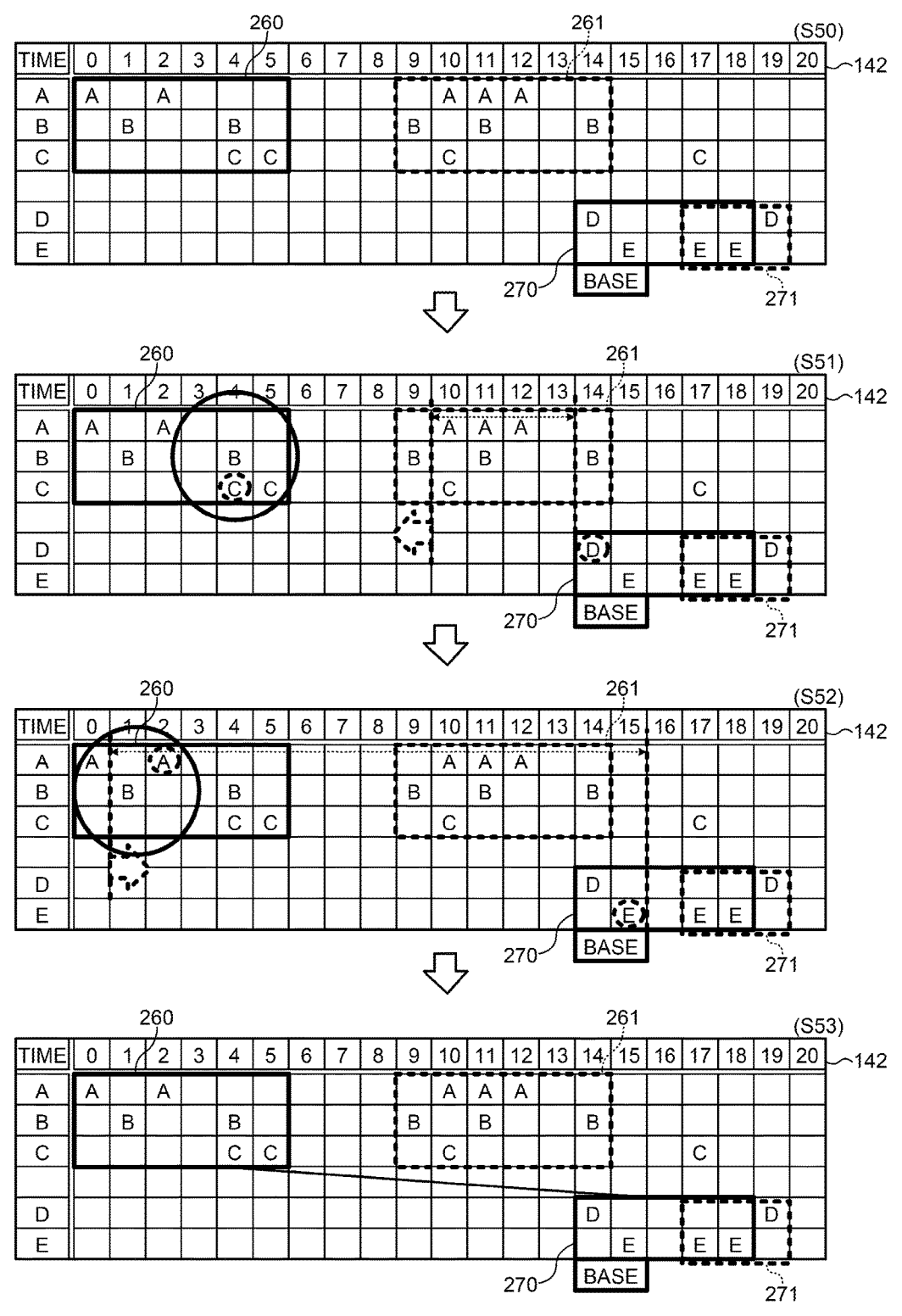

Explanation will be provided with reference to FIG. 22. The matching unit 252 sets a temporary window 260 that corresponds to the condition of the preceding window 141a of the query 141 and that is in a leading position, as a preceding window. The matching unit 252 sets a temporary window 270 that corresponds to the condition of the following window 141b of the query 141 and that is in a following position, as a following window. In addition, the matching unit 252 sets the following window 270 as a base following window (step S50).

The matching unit 252 judges whether the preceding window 260 and the following window 270 satisfy the minimum interval condition. The first reference time of the preceding window 260 is "4" of the event (4,C). The second reference time of the following window 270 is "14" of the event (14,D). Because the minimum interval is "10" and is larger than the minimum value "4" of the interval condition, the matching unit 252 determines that the preceding window 260 and the following window 270 satisfy the minimum interval condition (step S51).

The matching unit 252 judges whether the preceding window 260 and the following window 270 satisfy the maximum interval condition. The third reference time of the preceding window 260 is "2" of the event (2,A). The fourth reference time of the following window 270 is "15" of the event (15,E). In this situation, the maximum interval is "13" and is equal to or smaller than the sum "15" of the maximum value "8" of the interval condition, the preceding window width condition "4", and the following window width condition "3". Thus, the matching unit 252 determines that the preceding window 260 and the following window 270 satisfy the maximum interval condition (step S52).

The preceding window 260 and the following window 270 satisfy the minimum interval condition and the maximum interval condition. Thus, the matching unit 252 outputs a set made up of the preceding window 260 and the following window 270 and outputs a link therebetween (step S53).

Figure 23:
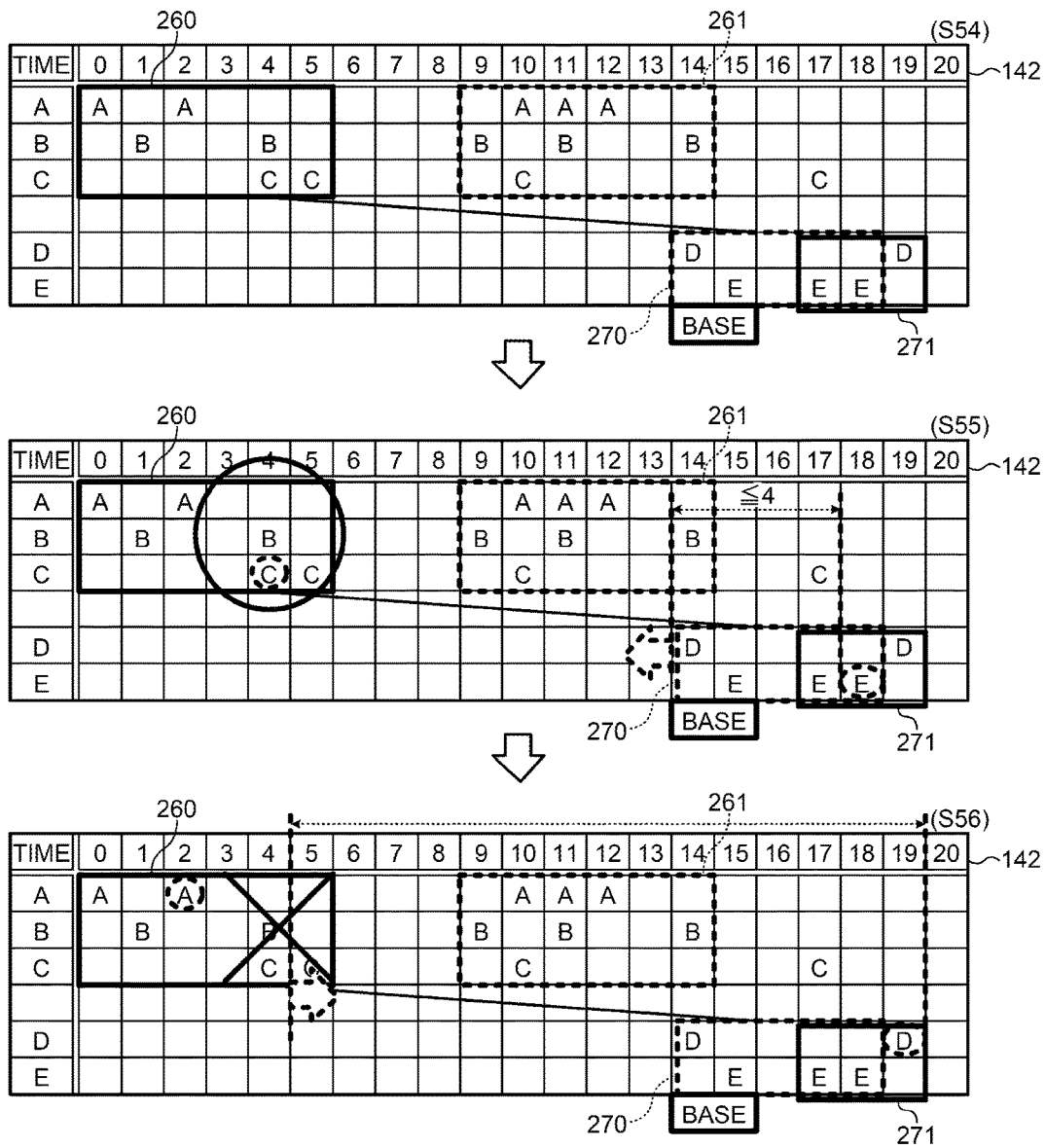
FIG. 23 is a second drawing for explaining the interval condition judging process according to the second embodiment.

The explanation will be continued with reference to FIG. 23. The matching unit 252 sets the next temporary window 271 subsequent to the following window 270 as a following window (step S54).

The matching unit 252 judges whether the preceding window 260 and the following window 271 satisfy the minimum interval condition. The first reference time of the preceding window 260 is "4" of the event (4,C). The second reference time of the following window 271 is "18" of the event (18,E). Because the minimum interval is "14" and is larger than the minimum value "4" of the interval condition, the matching unit 252 determines that the preceding window 260 and the following window 271 satisfy the minimum interval condition (step S55).

The matching unit 252 judges whether the preceding window 260 and the following window 271 satisfy the maximum interval condition. The third reference time of the preceding window 260 is "2" of the event (2,A). The fourth reference time of the following window 260 is "19" of the event (19,D). In this situation, the maximum interval is "17" and is larger than the sum "15" of the maximum value "8" of the interval condition, the preceding window width condition "4", and the following window width condition "3". Thus, the matching unit 252 determines that the preceding window 260 and the following window 271 do not satisfy the maximum interval condition (step S56).

Figure 24:
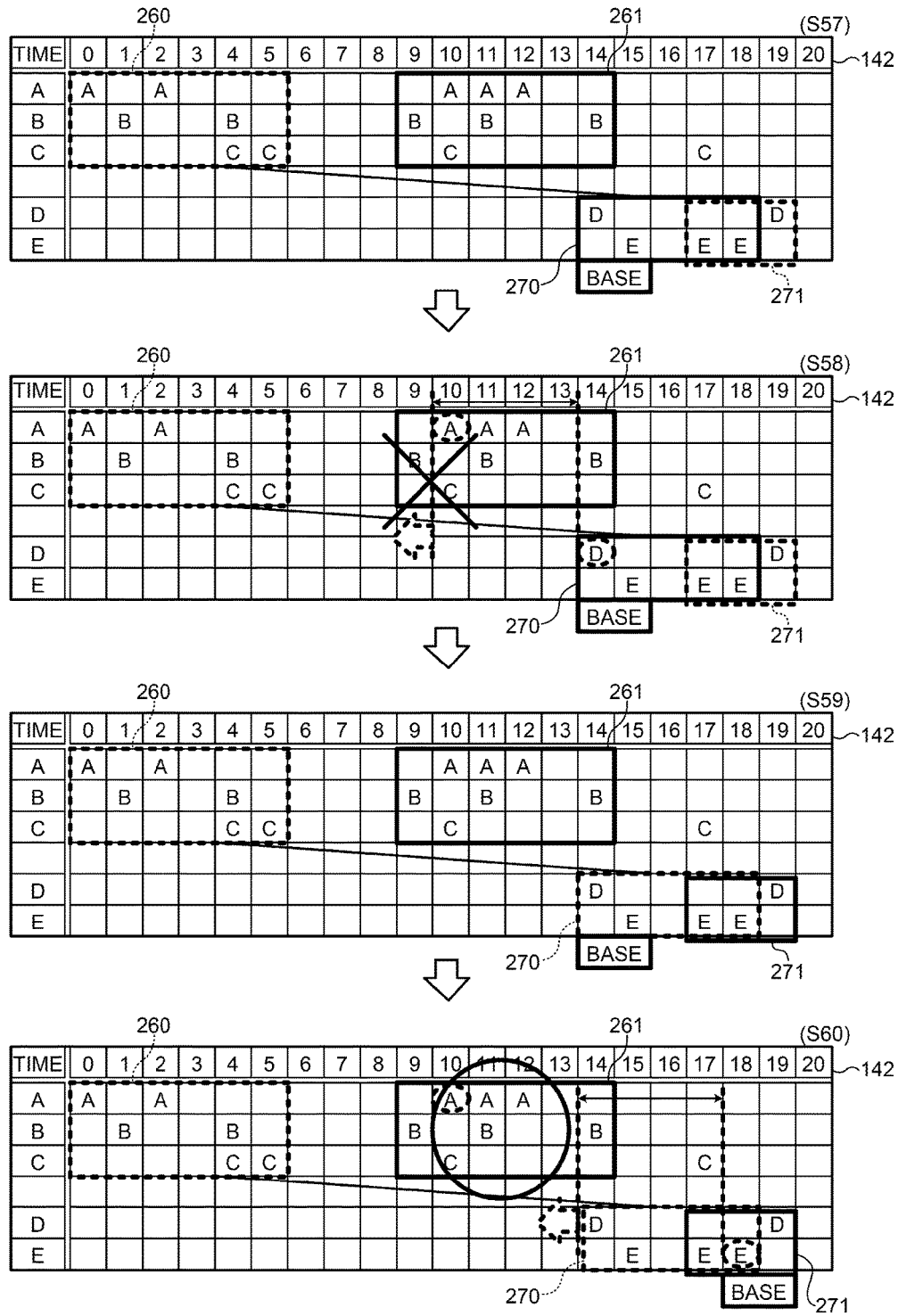
FIG. 24 is a third drawing for explaining the interval condition judging process according to the second embodiment.

The explanation will be continued with reference to FIG. 24. The matching unit 252 sets the next temporary window 261 subsequent to the preceding window 260 as a preceding window. The matching unit 252 sets the following window 270 as a base following window (step S57).

The matching unit 252 judges whether the preceding window 261 and the following window 270 satisfy the minimum interval condition. The first reference time of the preceding window 261 is "10" of the event (10,A). The second reference time of the following window 270 is "14" of the event (14,D). Because the minimum interval is "4" and is equal to or smaller than the minimum value "4" of the interval condition, the matching unit 252 determines that the preceding window 261 and the following window 270 do not satisfy the minimum interval condition. When the preceding window 261 and the base following window 270 do not satisfy the minimum interval condition, the preceding window 261 and the temporary window 271 do not satisfy the minimum interval condition, either (step S58).

The matching unit 252 sets the next temporary window 271 subsequent to the following window 270 as a following window and as a base following window (step S59).

The matching unit 252 judges whether the preceding window 261 and the following window 271 satisfy the minimum interval condition. The first reference time of the preceding window 261 is "10" of the event (10,A). The second reference time of the following window 271 is "18" of the event (18,E). Because the minimum interval is "8" and is larger than the minimum value "4" of the interval condition, the matching unit 252 determines that the preceding window 261 and the following window 271 satisfy the minimum interval condition (step S60).

Figure 25:
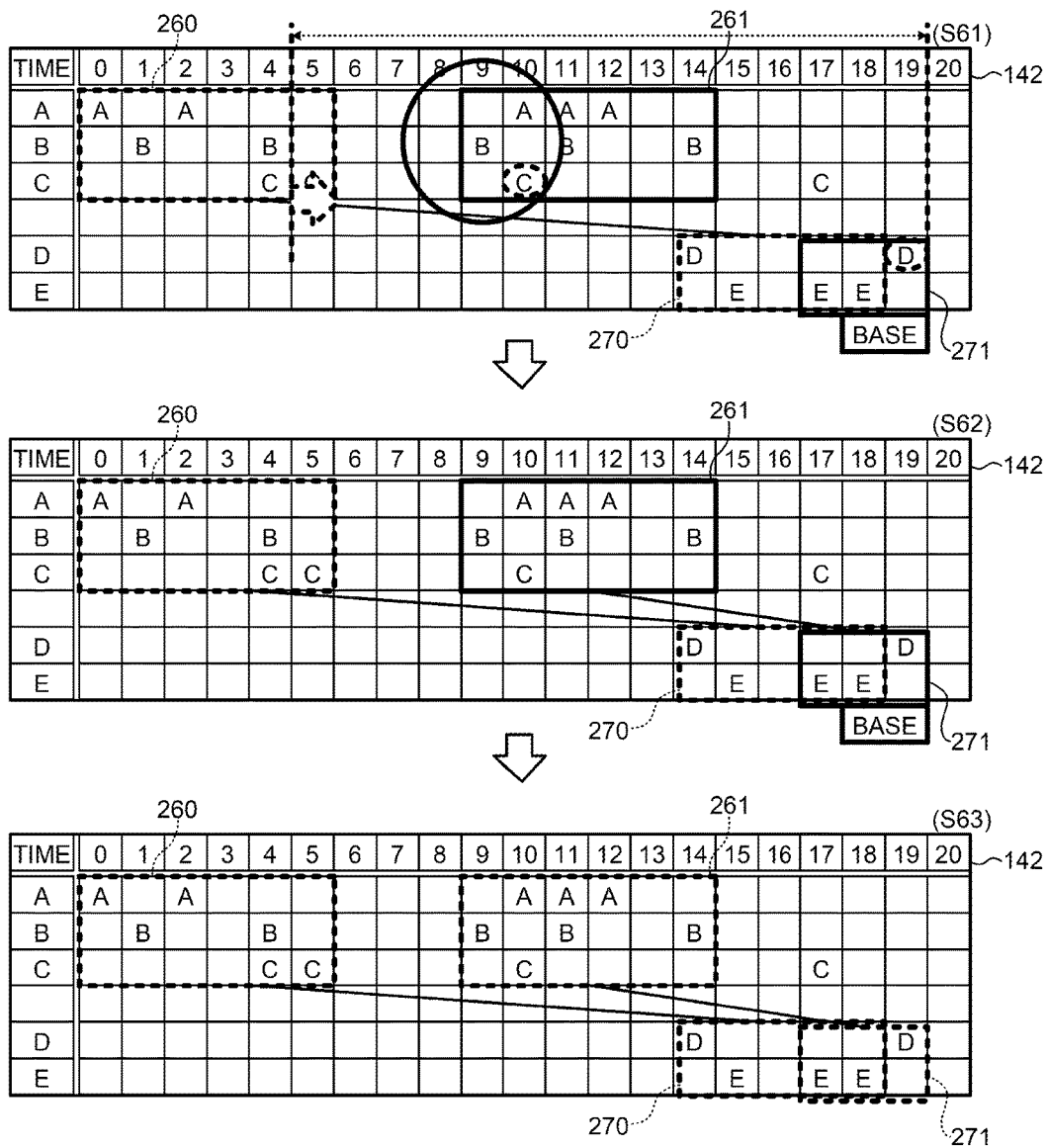
FIG. 25 is a fourth drawing for explaining the interval condition judging process according to the second embodiment.

The explanation will be continued with reference to FIG. 25. The matching unit 252 judges whether the preceding window 261 and the following window 271 satisfy the maximum interval condition. The third reference time of the preceding window 261 is "10" of the event (10,C). The fourth reference time of the following window 271 is "19" of the event (19,D). In this situation, the maximum interval is "9" and is equal to or smaller than the sum "15" of the maximum value "8" of the interval condition, the preceding window width condition "4", and the following window width condition "3". Thus, the matching unit 252 determines that the preceding window 261 and the following window 271 satisfy the maximum interval condition (step S61).

The preceding window 261 and the following window 271 satisfy the minimum interval condition and the maximum interval condition. Thus, the matching unit 252 outputs a set made up of the preceding window 261 and the following window 271 and outputs a link therebetween (step S62).

Because there is no next temporary window subsequent to the preceding window 261, the matching unit 252 ends the interval condition judging process. As a result of performing the processes illustrated in FIGS. 22 to 25, the matching unit 252 has output the set made up of the preceding window 260 and the following window 270 and the set made up of the preceding window 261 and the following window 271.

After performing the interval condition judging process for the temporary windows, the matching unit 252 performs the combination expanding process so as to determine one or more sets of events each satisfying the conditions of the query 141. FIG. 26 is a drawing of an exemplary result of the combination expanding process.

In FIG. 26, a group of events 300 represents a result of a combination expanding process performed on the preceding window 260 and the following window 270. A group of events 400 represents a result of a combination expanding process performed on the preceding window 261 and the following window 271. The matching unit 252 identifies one or more sets of events each satisfying the conditions of the query 141 from the group of events 300 and the group of events 400.

Among the group of events 300, each of the sets of events 306 and 309 satisfies the conditions of the query 141. Among the group of events 400, each of the sets of events 401 to 404, 406 to 409, and 411 to 414 satisfies the conditions of the query 141. Thus, the matching unit 252 outputs the sets of events 306, 309, 401 to 404, 406 to 409, and 411 to 414 as a matching result of the query 141.

Figure 27:
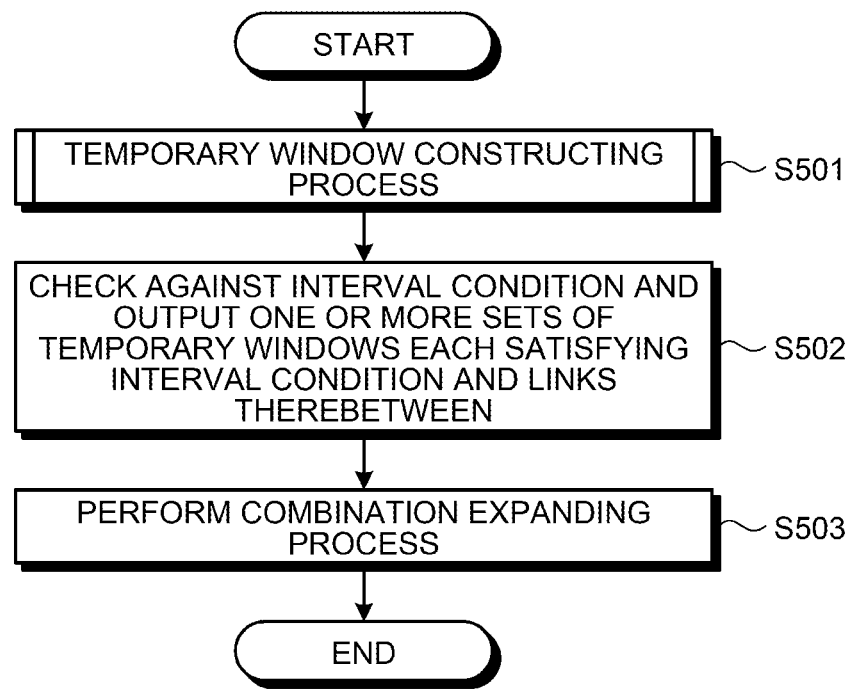
FIG. 27 is a flowchart of a processing procedure performed by a matching apparatus according to the second embodiment.

Next, a processing procedure performed by the matching apparatus 200 according to the second embodiment will be explained. FIG. 27 is a flowchart of the processing procedure performed by the matching apparatus according to the second embodiment. As illustrated in FIG. 27, the matching apparatus 100 performs the temporary window constructing process (step S501). The temporary window constructing process at step S501 is the process corresponding to the processing procedure illustrated in FIG. 14.

The matching apparatus 200 checks against the interval condition and outputs one or more sets of temporary windows each satisfying the interval condition and one or more links therebetween (step S502). The process at step S502 is the process corresponding to the processing procedure illustrated in FIGS. 20 and 21. The matching apparatus 200 performs a combination expanding process and outputs one or more sets of events each satisfying the conditions of the query 141 (step S503).

Next, advantageous effects of the matching apparatus 200 according to the second embodiment will be explained. The matching apparatus 200 sets "w" to be a value equal to or larger than the window width condition of the query 141. The matching apparatus 200 then identifies the event that occurs first ("the first-occurring event") after "2×w" has elapsed since the start time of the window. After that, the matching apparatus 200 sequentially constructs the temporary windows by determining the time at which the next event occurs past the time that is earlier by "w−1" than the first-occurring event, as the start time of the next temporary window. The matching apparatus 200 then judges whether the temporary windows satisfy the conditions of the query 141. Thus, the matching apparatus 200 is able to reduce the number of combinations of windows against which the interval condition needs to be checked. Consequently, it is possible to perform the matching procedure on the query and the match data at a high speed.

Further, the matching apparatus 200 judges whether the interval condition of the query 141 is satisfied, on the basis of the times of the events included in the preceding window and the following window. More specifically, from among the events included in the preceding window, the matching apparatus 200 identifies the time of the latest event among the first set of events satisfying the event condition to be the first reference time. Further, from among the events included in the following window, the matching apparatus 200 identifies the time of the earliest event among the last set of events satisfying the event condition to be the second reference time. After that, the matching apparatus 200 judges whether the minimum interval condition is satisfied on the basis of the interval between the first reference time and the second reference time and the minimum interval condition.

Further, from among the events included in the preceding window, the matching apparatus 200 identifies the time of the earliest event among the last set of events satisfying the event condition to be the third reference time. Further, the matching apparatus 200 identifies the time of the latest event among the first set of events included in the following window to be the fourth reference time. After that, the matching apparatus 200 judges whether the maximum interval condition is satisfied on the basis of the interval between the third reference time and the fourth reference time, the maximum interval condition, the width of the preceding window, and the width of the following window.

Subsequently, if a set made up of a preceding window and a following window satisfies both the minimum interval condition and the maximum interval condition, the matching apparatus 200 determines that the set satisfies the interval condition of the query 141. Thus, it is possible to more accurately identify the sets of windows including the sets of events that can serve as solutions to the query 141.

Figure 28:
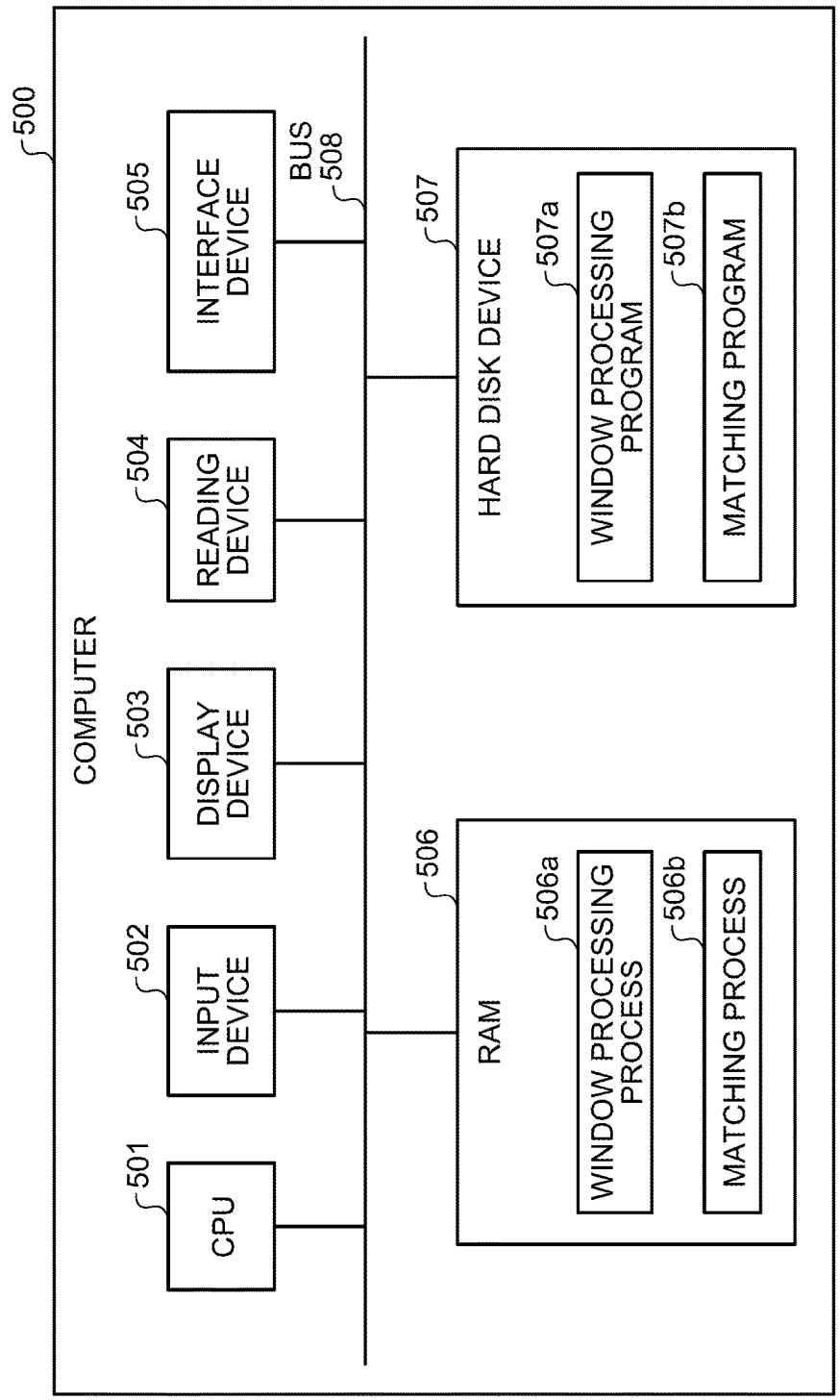
FIG. 28 is a diagram of an example of a computer that executes a matching program.
Figure 29:
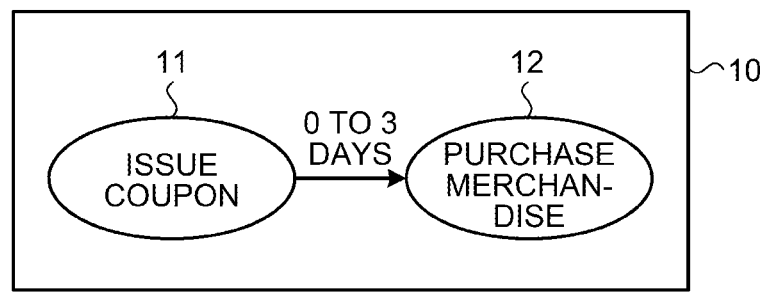
FIG. 29 is a first diagram of an example of a query used for explaining a conventional technique.
Figure 31:
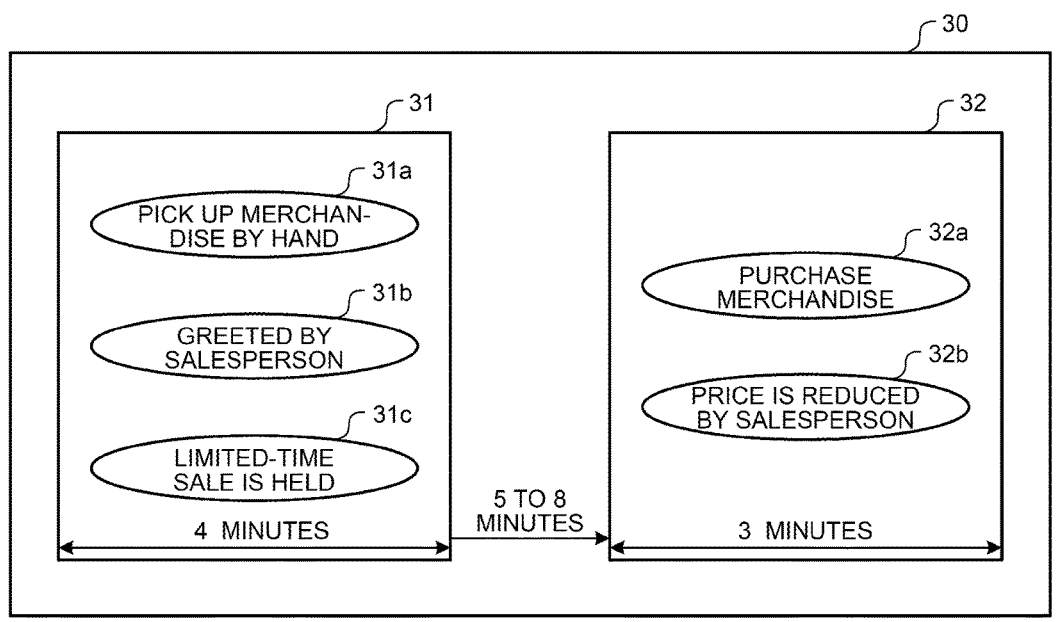
FIG. 31 is a diagram of an example of a query having a window-type serial pattern.
Figure 32:
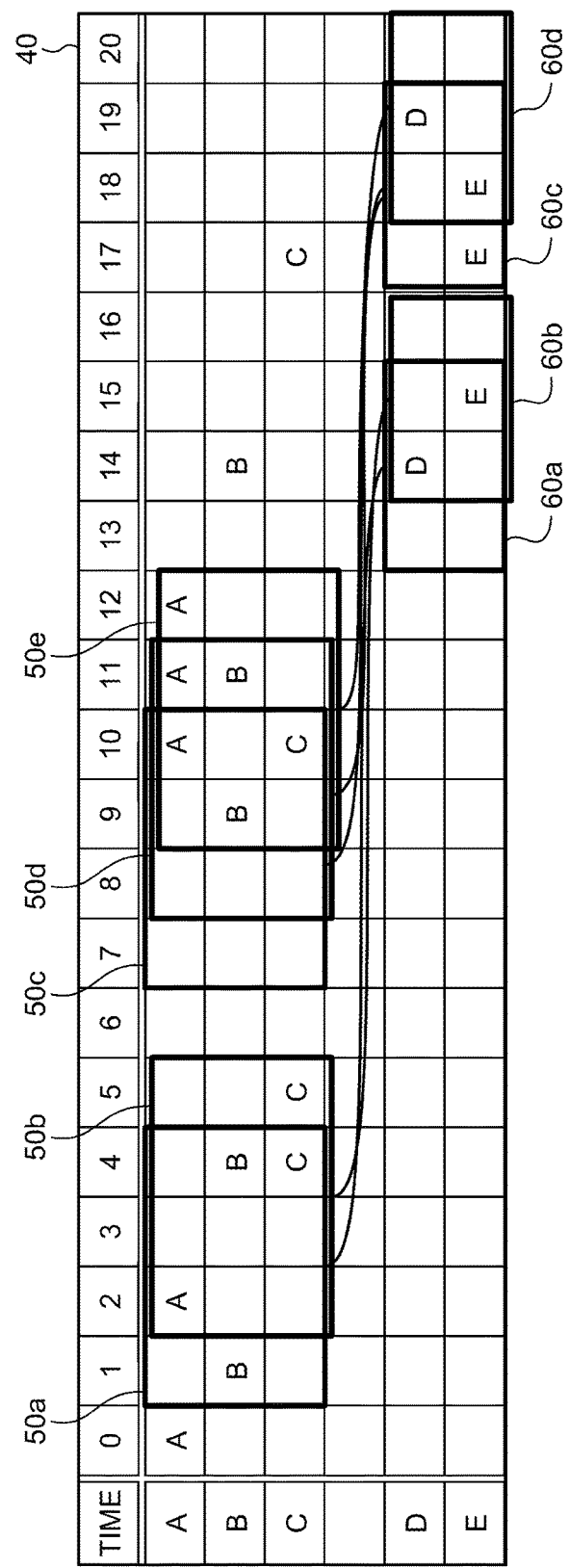
FIG. 32 is a drawing for explaining an exemplary method according to a conventional technique.

Next, an example of a computer that executes a matching program that realizes the same functions as those of the matching apparatuses described in the exemplary embodiments above will be explained. FIG. 28 is a diagram of an example of the computer that executes the matching program.

As illustrated in FIG. 28, a computer 500 includes: a CPU 501 that performs various types of computing processes; an input device 502 that receives inputs of data from a user; and a display device 503. Further, the computer 500 includes: a reading device 504 that reads a program or the like from a storage medium; and an interface device 505 that exchanges data with another computer via a network. Further, the computer 500 includes a RAM 506 that temporarily stores therein various types of information; and a hard disk device 507. Further, the devices 501 to 507 are connected to a bus 508.

The hard disk device 507 includes a window processing program 507a and a matching program 507b. The CPU 501 reads the programs 507a and 507b and loads the read programs into the RAM 506.

The window processing program 507a functions as a window processing process 506a. The matching program 507b functions as a matching process 506b.

For example, the window processing process 506a corresponds to the window processing units 151 and 251. The matching process 506b corresponds to the matching units 152 and 252.

The programs 507a and 507b do not necessarily have to be stored in the hard disk device 507 from the beginning. For example, the programs may be stored in a "portable physical medium" such as a flexible disk (FD), a Compact Disk Read-Only Memory (CD-ROM), a Digital Versatile Disk (DVD), a magneto-optical disk, or an Integrated Circuit (IC) card that can be inserted into the computer 500. The computer 500 then may read the programs 507a and 507b from any of these media and execute the read programs.

According to an aspect of an embodiment of the present invention, an advantageous effect is achieved where it is possible to perform the matching procedure on the query and the match data at a high speed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A matching method implemented by a computer, the matching method comprising:
   setting second windows within match data in which each of events is kept in correspondence with an occurrence time of the event, the second windows each having a window width larger than a window width in a window width condition, on a basis of a query in which a plurality of event conditions are kept in correspondence with two or more first windows, in which a predetermined window width condition is set with each of the first windows, and in which the two or more of the first windows are connected in series under a predetermined interval condition; and
   judging whether events in the match data included in the second windows and an interval between the second windows satisfy an event condition of a first window and the interval condition
   wherein the setting finds a time of an event that occurs first past a time that is later by double a second window width than a start time of the second window and a return-point time that is earlier than the time of the event by the second window width, and sets a next second window whose start time equals to a time of an event following the return-point time.

2. The matching method according to claim 1, wherein the interval condition includes a minimum interval condition, and the judging identifies a first time of a latest event among a first set of events satisfying the event condition from among events included in a preceding second window and a second time of an earliest event among a last set of events satisfying the event condition from among events included in a following second window and judges whether the preceding second window and the following second window satisfy the interval condition on a basis of an interval between the first time and the second time and the minimum interval condition.

3. The matching method according to claim 1, wherein the interval condition includes a maximum interval condition, and the judging identifies a third time of an earliest event among a last set of events satisfying the event condition from among events included in a preceding second window and a fourth time of a latest event among a first set of events satisfying the event condition from among events included in a following second window and judges whether the preceding second window and the following second window satisfy the interval condition on a basis of an interval between the third time and the fourth time, the maximum interval condition, a width of the preceding second window, and a width of the following second window.

4. A non-transitory computer-readable recording medium having stored therein a program for causing a computer to execute a process comprising:

setting second windows within match data in which each of events is kept in correspondence with an occurrence time of the event, the second windows each having a window width larger than a window width in a window width condition, on a basis of a query in which a plurality of event conditions are kept in correspondence with two or more first windows, in which a predetermined window width condition is set with each of the first windows, and in which the two or more of the first windows are connected in series under a predetermined interval condition; and judging whether events in the match data included in the second windows and an interval between the second windows satisfy an event condition of a first window and the interval condition wherein the setting finds a time of an event that occurs first past a time that is later by double a second window width than a start time of the second window and a return-point time that is earlier than the time of the event by the second window width, and sets a next second window whose start time equals to a time of an event following the return-point time.

5. The non-transitory computer-readable recording medium according to claim 4, wherein the interval condition includes a minimum interval condition, and the judging identifies a first time of a latest event among a first set of events satisfying the event condition from among events included in a preceding second window and a second time of an earliest event among a last set of events satisfying the event condition from among events included in a following second window and judges whether the preceding second window and the following second window satisfy the interval condition on a basis of an interval between the first time and the second time and the minimum interval condition.

6. The non-transitory computer-readable recording medium according to claim 4, wherein the interval condition includes a maximum interval condition, and the judging identifies a third time of an earliest event among a last set of events satisfying the event condition from among events included in a preceding second window and a fourth time of a latest event among a first set of events satisfying the event condition from among events included in a following second window and judges whether the preceding second window and the following second window satisfy the interval condition on a basis of an interval between the third time and the fourth time, the maximum interval condition, a width of the preceding second window, and a width of the following second window.

* * * * *